(12) United States Patent
Tanaka et al.

(10) Patent No.: US 12,659,997 B2
(45) Date of Patent: Jun. 16, 2026

---

(54) COMMUNICATION DEVICE

(71) Applicant: Sony Group Corporation, Tokyo (JP)

(72) Inventors: Ken Tanaka, Tokyo (JP); Shigeru Sugaya, Tokyo (JP); Ryuichi Hirata, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 343 days.

(21) Appl. No.: 18/551,403

(22) PCT Filed: Jan. 24, 2022

(86) PCT No.: PCT/JP2022/002395
§ 371 (c)(1),
(2) Date: Sep. 20, 2023

(87) PCT Pub. No.: WO2022/209212
PCT Pub. Date: Jun. 10, 2022

(65) Prior Publication Data
US 2024/0172284 A1 May 23, 2024

(30) Foreign Application Priority Data
Mar. 29, 2021 (JP) ................................. 2021-054716

(51) Int. Cl.
*H04W 74/0816* (2024.01)
*H04W 8/22* (2009.01)
(Continued)

(52) U.S. Cl.
CPC ......... *H04W 74/0816* (2013.01); *H04W 8/22* (2013.01); *H04W 74/0866* (2013.01); *H04W 76/15* (2018.02)

(58) Field of Classification Search
CPC ............... H04W 74/0816; H04W 8/22; H04W 74/0866; H04W 76/15; H04W 84/12
See application file for complete search history.

(56) References Cited

U.S. PATENT DOCUMENTS

2015/0304060 A1* 10/2015 Xiao ...................... H04L 45/68
370/503
2017/0019818 A1 1/2017 Xing et al.
(Continued)

FOREIGN PATENT DOCUMENTS

CN 112512135 A 3/2021
WO WO-2019040345 A1 * 2/2019 ........ H04W 74/0816

OTHER PUBLICATIONS

International Search Report and Written Opinion mailed on Mar. 22, 2022, received for PCT Application PCT/JP2022/002395, filed on Jan. 24, 2022, 8 pages including English Translation.
(Continued)

*Primary Examiner* — Sudesh M. Patidar
(74) *Attorney, Agent, or Firm* — XSENSUS LLP

(57) ABSTRACT

A communication method and a corresponding communication device including a control circuit configured to perform control for: exchanging a frame with another communication device wirelessly by using a plurality of links; transmitting, to the another communication device, a first frame including a request for acquisition of a transmission right on a first link by using the first link; generating a third frame including information for triggering the another communication device to acquire a transmission right on a second link different from the first link in a case where a second frame including permission to acquire the transmission right on the first link is received, the second frame being transmitted from the another communication device by using the first link; and transmitting the third frame to the another communication device by using the first link.

4 Claims, 16 Drawing Sheets

(51) Int. Cl.
    *H04W 74/08*     (2009.01)
    *H04W 76/15*     (2018.01)

(56)              References Cited

U.S. PATENT DOCUMENTS

| | | | |
|---|---|---|---|
| 2021/0014811 A1* | 1/2021 | Seok | H04W 76/15 |
| 2021/0211937 A1* | 7/2021 | Qu | H04L 1/1642 |
| 2023/0073114 A1* | 3/2023 | Jang | H04L 69/323 |

OTHER PUBLICATIONS

Seok et al., "Proposed Draft Text for MLO Multi-Link Channel Access: PPDU End Time Alignment" IEEE P802.11, Wireless LANs, Sep. 9, 2020, pp. 1-4.

* cited by examiner

Figure 18:
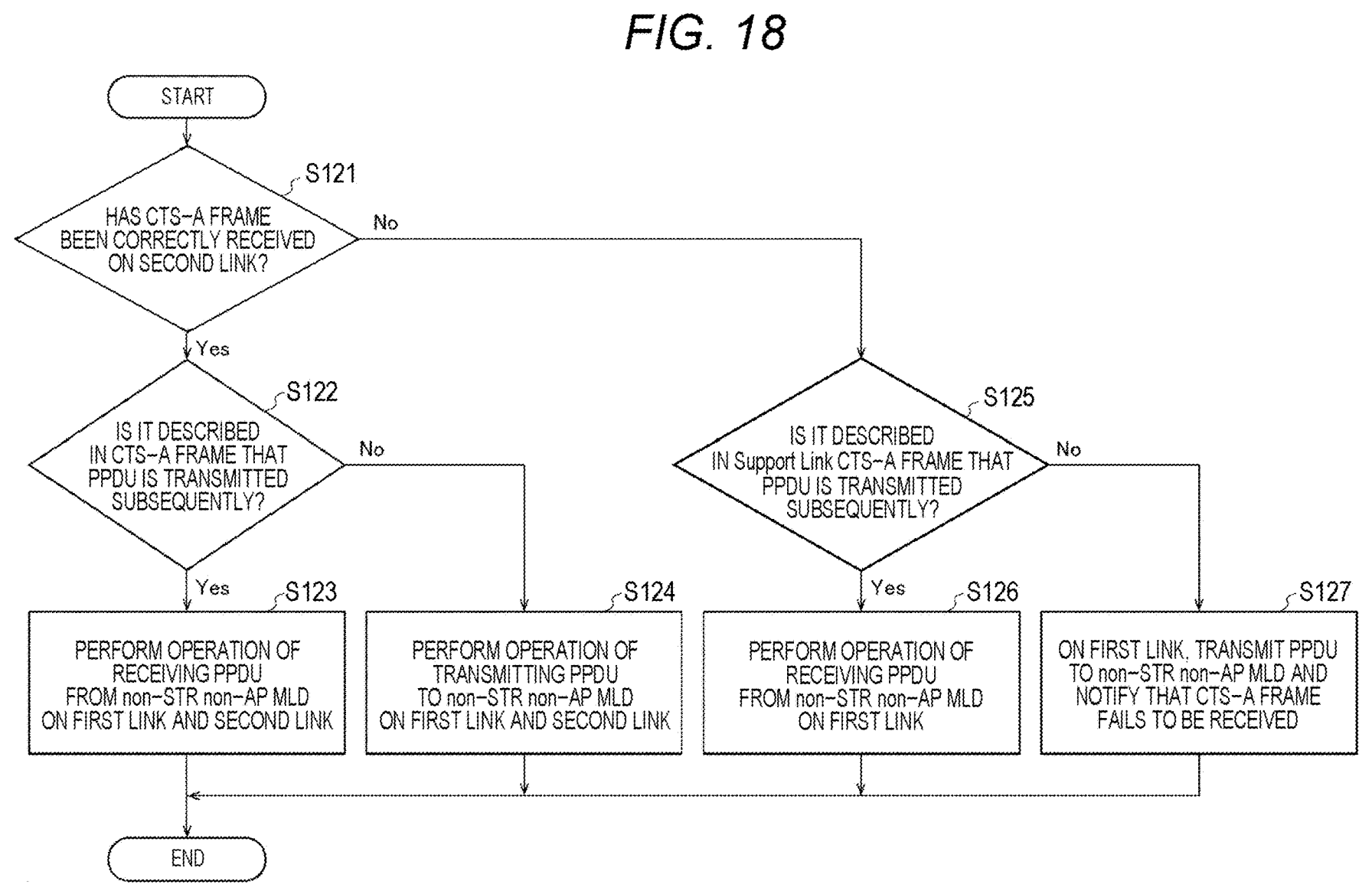

START

S121 — HAS CTS-A FRAME BEEN CORRECTLY RECEIVED ON SECOND LINK?

No →

S125 — IS IT DESCRIBED IN Support Link CTS-A FRAME THAT PPDU IS TRANSMITTED SUBSEQUENTLY?

No → S127 — ON FIRST LINK, TRANSMIT PPDU TO non-AP MLD AND NOTIFY THAT CTS-A FRAME FAILS TO BE RECEIVED Yes → S126 — PERFORM OPERATION OF RECEIVING PPDU FROM non-STR non-AP MLD ON FIRST LINK Yes ↓

S122 — IS IT DESCRIBED IN CTS-A FRAME THAT PPDU IS TRANSMITTED SUBSEQUENTLY?

No → S124 — PERFORM OPERATION OF TRANSMITTING PPDU TO non-STR non-AP MLD ON FIRST LINK AND SECOND LINK Yes → S123 — PERFORM OPERATION OF RECEIVING PPDU FROM non-STR non-AP MLD ON FIRST LINK AND SECOND LINK

END

COMMUNICATION DEVICE

CROSS-REFERENCE TO RELATED APPLICATIONS

The present application is based on PCT filing PCT/JP2022/002395, filed Jan. 24, 2022, which claims priority from Japanese Patent Application No. 2021-054716, filed Mar. 29, 2021, the entire contents of each are incorporated herein by reference.

TECHNICAL FIELD

The present technology relates to a communication device, and particularly, to a communication device capable of increasing an opportunity to acquire a transmission right on a plurality of links.

BACKGROUND ART

In recent years, with the spread of a wireless local area network (LAN), it is required to expand a frequency bandwidth used for transmission. Therefore, transmission with a wider frequency bandwidth has been studied by simultaneously using a plurality of frequency bands such as a 5 GHz band and a 6 GHz band. This frequency band is referred to as a link.

As a technology related to transmission using a plurality of links, for example, a technology disclosed in Non-Patent Document 1 is known.

CITATION LIST

Non-Patent Document

Non-Patent Document 1: Yongho Seok, et al., "Proposed Draft Text for MLO Multi-Link Channel Access: PPDU End Time Alignment", IEEE 802.11-20/1271r8, Sep. 9, 2020

SUMMARY OF THE INVENTION

Problems to be Solved by the Invention

When signals are simultaneously received through a plurality of links, the reception completion times of reception signals on the links need to be aligned, and there is a possibility that the transmission rights are acquired by other terminals before all the links are usable. Therefore, there has been a demand for a method for increasing an opportunity to acquire the transmission right on a plurality of the links.

The present technology has been made in view of the above-described circumstances, and an object thereof is to increase an opportunity to acquire a transmission right on a plurality of links.

Solutions to Problems

According to an aspect of the present technology, there is provided a communication device including a control unit configured to perform control for: exchanging a frame with another communication device wirelessly by using a plurality of links; transmitting, to the another communication device, a first frame including a request for acquisition of a transmission right on a first link by using the first link; generating a third frame including information for triggering the another communication device to acquire a transmission right on a second link different from the first link in a case where a second frame including permission to acquire the transmission right on the first link is received, the second frame being transmitted from the another communication device by using the first link; and transmitting the third frame to the another communication device by using the first link.

In the communication device according to the aspect of the present technology, exchanging of a frame with another communication device is performed wirelessly by using a plurality of links, a first frame including a request for acquisition of a transmission right on a first link is transmitted to the another communication device by using the first link, a third frame including information for triggering the another communication device to acquire a transmission right on a second link different from the first link is generated in a case where a second frame including permission to acquire the transmission right on the first link is received, the second frame being transmitted from the another communication device by using the first link, and the third frame is transmitted to the another communication device by using the first link.

According to another aspect of the present technology, there is provided a communication device including a control unit configured to perform control for: exchanging a frame with another communication device wirelessly by using a plurality of links; transmitting, to the another communication device, a second frame including permission to acquire a transmission right on a first link by using the first link in a case where a first frame including a request for acquisition of a transmission right on the first link is received, the first frame being transmitted from the another communication device by using the first link; generating a fourth frame including information indicating a transmission right acquired on a second link in a case where a third frame including information for triggering acquisition of the transmission right on the second link different from the first link is received, the third frame being transmitted from the another communication device by using the first link; and transmitting the fourth frame to the another communication device by using the first link.

In the communication device according to the aspect of the present technology, exchanging of a frame with another communication device is performed wirelessly by using a plurality of links, a second frame including permission to acquire a transmission right on a first link is transmitted to the another communication device by using the first link in a case where a first frame including a request for acquisition of a transmission right on the first link is received, the first frame being transmitted from the another communication device by using the first link, a fourth frame including information indicating a transmission right acquired on a second link is generated in a case where a third frame including information for triggering acquisition of the transmission right on the second link different from the first link is received, the third frame being transmitted from the another communication device by using the first link, and the fourth frame is transmitted to the another communication device by using the first link.

Note that the communication device according to the aspect of the present technology may be an independent device or an internal block configuring one device.

BRIEF DESCRIPTION OF DRAWINGS

FIG. 2 is a diagram illustrating a frame transmitted by each terminal in time series.

FIG. 18 is a flowchart illustrating a flow of processing performed by an STR AP MLD.

MODE FOR CARRYING OUT THE INVENTION

<Overview of Present Technology>

Figure 1:
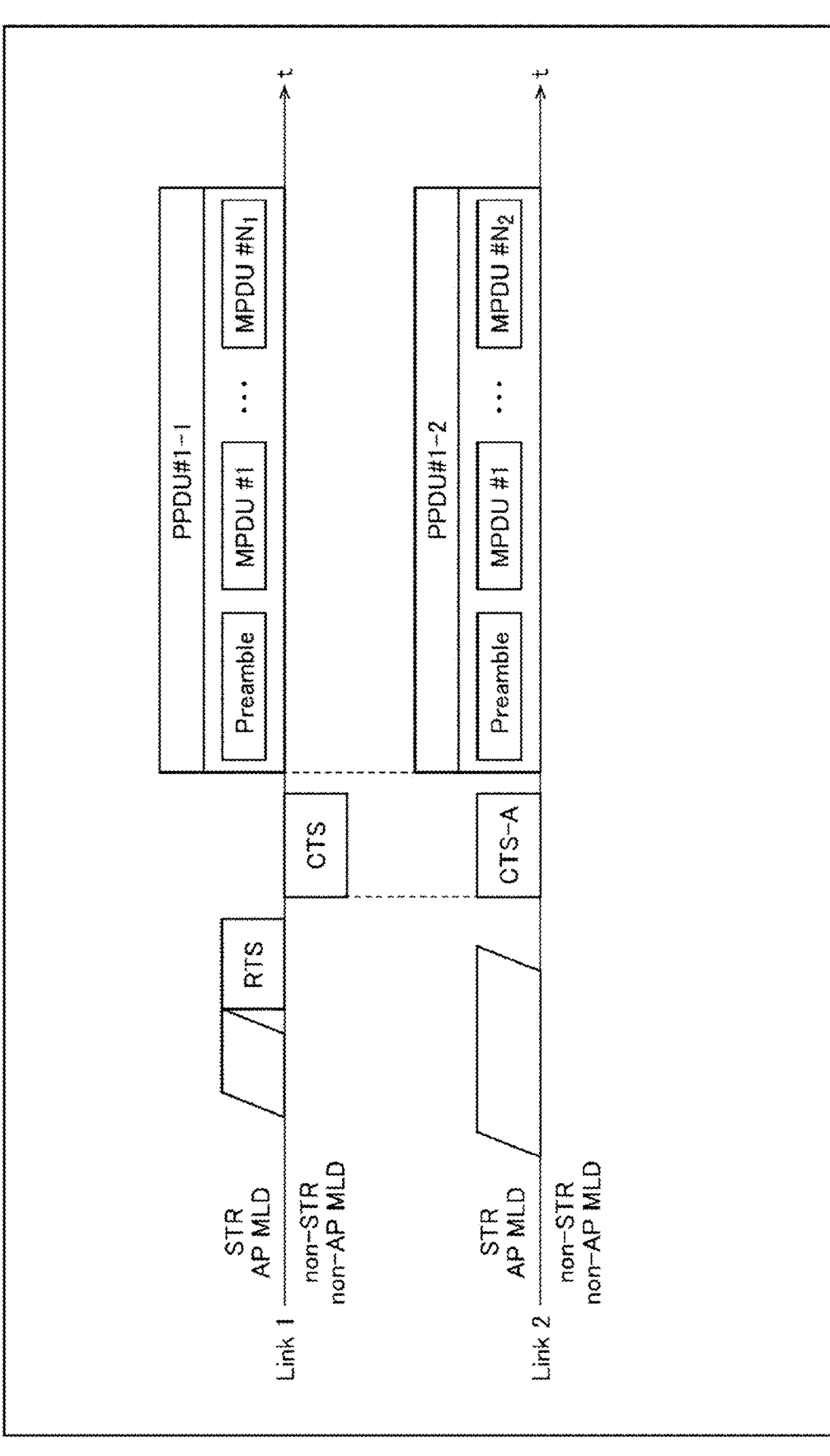
FIG. 1 is a diagram illustrating a frame transmitted by each terminal in time series.

In a wireless LAN, in an unlicensed band, in one basic service set (BSS), an access point (access point (AP) or a base station (BS)) and a user terminal (a station (STA) or user equipment (UE)) autonomously acquire a transmission right in the BSS and perform communication.

The amount of data that is used in high-definition video transmission such as augmented reality (AR), virtual reality (VR), or 4K/8K is significantly great these days, and a higher transmission capacity is required in wireless transmission. Therefore, there is a demand for an expansion of a transmission frequency bandwidth used in the transmission. Note that 4K has about 4000 pixels in a horizontal direction, and 8K has about 8000 pixels in the horizontal direction.

However, a frequency band as the unlicensed band is limited, and it is difficult to secure a wide frequency bandwidth. In view of this, in IEEE 802.11 Task Group (TG) be, transmission with a substantially wider frequency bandwidth by simultaneously using a plurality of frequency bands such as a 5 GHz band and a 6 GHz band has been studied.

Here, the frequency band is referred to as a kink, and a terminal that can perform transmission using a plurality of the frequency bands or a plurality of the links at the same time is also referred to as a multi-link device (MLD). Specifically, an access point and a user terminal, which are the MLDs, are referred to as below.

That is, an access point (AP) that is the MLD is referred to as an access point multi-link device (AP MLD), and a user terminal (STA) that is the MLD is referred to as a non-access point multi-link device (non-AP MLD).

"Performing transmission using a plurality of links at the same time" described herein does not mean performing transmission while controlling a plurality of the links independently, but means separately controlling communication operation between a plurality of the links in order to improve a communication quality. For example, an object is to realize the following operation.

That is, it is possible to first transmit a synchronized signal between a plurality of the links, and second to perform uplink transmission of transmitting from a user terminal to an access point on a certain link, and to perform downlink transmission of transmitting from the access point to the user terminal on a different link.

Note that a link is a wireless transmission path through which data can be transmitted between two communication devices, and the frequency bands of the links may be different.

At this time, since a terminal that can perform transmission on a plurality of links coexists with a terminal that can perform transmission only at a single frequency, it is conceivable to acquire a transmission right for each frequency band. Furthermore, for example, there may be a case where one user terminal performs uplink transmission to an access point in a 5 GHz band and performs downlink transmission to the access point in a 6 GHz band, and a case where only uplink transmission or only downlink transmission is performed on both links.

That is, it is assumed that a plurality of the links is used, transmission and reception are performed at the same time in each link (Simultaneous Transmit and Receive (STR)), or either transmission or reception is performed on a plurality of the links (non-STR (NSTR)).

Here, according to Non-Patent Document 1 (hereinafter, referred to as Document 1), in a case where a non-AP MLD performs STR, there is a problem that self-interference is greater and the communication quality deteriorates since a signal transmitted by the non-AP MLD leaks into a signal received by the non-AP MLD. This problem is caused by, for example, the following factors.

That is, in a case where first, the degree of proximity between links (frequency bands), and second, the non-AP MLD uses different antennas for each link, the correlation between the antennas of the non-AP MLD and the characteristic of the band pass filter attached to the antenna are provided as factors.

The non-AP MLD causing the above-described problem is defined as a terminal that does not perform STR, and defined as a non-STR non-AP MLD or defined to be NSTR limited (STA is NSTR limited).

However, depending not only on a terminal profile but also the links being used at the same time, control may be performed to be operated as a non-STR MLD on a specific link pair and operated as an STR MLD on another link pair.

Hereinafter, a non-STR non-AP MLD is defined as a "non-AP MLD that operates as non-STR for at least the current link pair".

Here, in a case where the non-STR non-AP MLD receives signals from a certain terminal on a plurality of the links at the same time, the reception completion times of the reception signals on the links need to be aligned.

This is based on the fact that, in the wireless LAN, it is a normal operation for the terminal to transmit an acknowledgment (Ack) within a specified period of time after the completion of reception of the reception signal. Therefore, when the reception completion times of the reception signals are not aligned, the user terminal transmits Ack through one link among a plurality of the links, but receives a signal on another link, and thus STR is performed unintentionally.

Note that each of the signals described above is a data unit having a certain time width, and is referred to as a PHY protocol data unit (PPDU) in Document 2. Furthermore, Document 1 describes that the above-described specified period is a value depending on the mounting of the device, but is set to about 16 microseconds, and that, in a case where signals are transmitted to the same non-STR non-AP MLD as a destination by using a plurality of links, the transmission completion times of the transmission signals on the links have a difference of eight microseconds or shorter.

Document 2: IEEE Std 802.11™-2016

As described above, when transmission to the non-STR non-AP MLD is performed on a plurality of the links, it is necessary that the reception completion times (or the transmission completion times of the transmission signals) on the links are aligned, and in Document 3, the following two methods are defined as transmission methods satisfying this.

That is, first, transmission performed by aligning transmission start times of data to be transmitted between different links is defined as synchronized transmission (Sync. TX), and second, transmission performed without aligning transmission start times of data to be transmitted between different links is defined as asynchronized transmission (Asnyc TX).

Document 3: Zhou Lan, et al., "MLO a-synchronize and synchronize operation discussions", IEEE 802.11-20/291r1 Jan. 20, 2020

Document 1 describes a condition for performing the synchronized transmission. In the wireless LAN, each terminal cannot acquire a transmission right until a random standby time (back-off) expires. The condition described above is that the transmission is performed only in a case where the transmission right has been acquired on each link after each back-off expires on a plurality of the links. The reason why this condition is necessary is that fairness should be maintained between the links since the back-off is determined by the congestion degree of transmission on each link.

However, in a case where there is a deviation in the congestion degree of transmission on each link, the back-off to be applied on both links varies. For this reason, in a case where the back-off on each link expires, synchronized transmission is inevitably performed in accordance with an environment where transmission is most congested. Therefore, during the period of waiting for expiring of the back-off on all the links before synchronized transmission, a transmission right on a link is acquired by another terminal, and the probability of being capable of performing synchronized transmission becomes lower.

Therefore, when the asynchronized transmission is adopted, a transmission right can be acquired from a link on which the back-off has expired, and the probability of being capable of performing multi-link transmission to the non-STR non-AP MLD can be increased. As a result, this contributes to an increase in throughput of the entire system.

Hereinafter, a link on which the transmission right can be acquired first is referred to as a first link (Link 1), a link on which the transmission right can be acquired later is referred to as a second link (Link 2), and data to be transmitted is referred to as a PHY data protocol data unit (PPDU).

As a method for performing the asynchronized transmission described above, Document 3 describes using of the following methods A to C.

A: On each link, a PPDU is transmitted asynchronously after back-off expires

B: After notification of a ready to send (RTS) frame is provided on the first link, notification of a clear to send (CTS) frame is provided on the first link and the second link to acquire a transmission opportunity (TXOP) and a PPDU is transmitted C: A PPDU is transmitted after notification of the RTS frame and the CTS frame is provided on the first link to acquire the TXOP, but the PPDU is transmitted without transmitting the RTS frame and the CTS frame on the second link In the method B and the method C, essentially, the transmission right on each link is acquired before data transmission by notification of the RTS frame and the CTS frame on the first link (Link 1). On the other hand, the frame transmitted on the second link (Link 2) differs depending on a time difference at which the back-off on each link expires and the constraint of NSTR.

Figure 2:
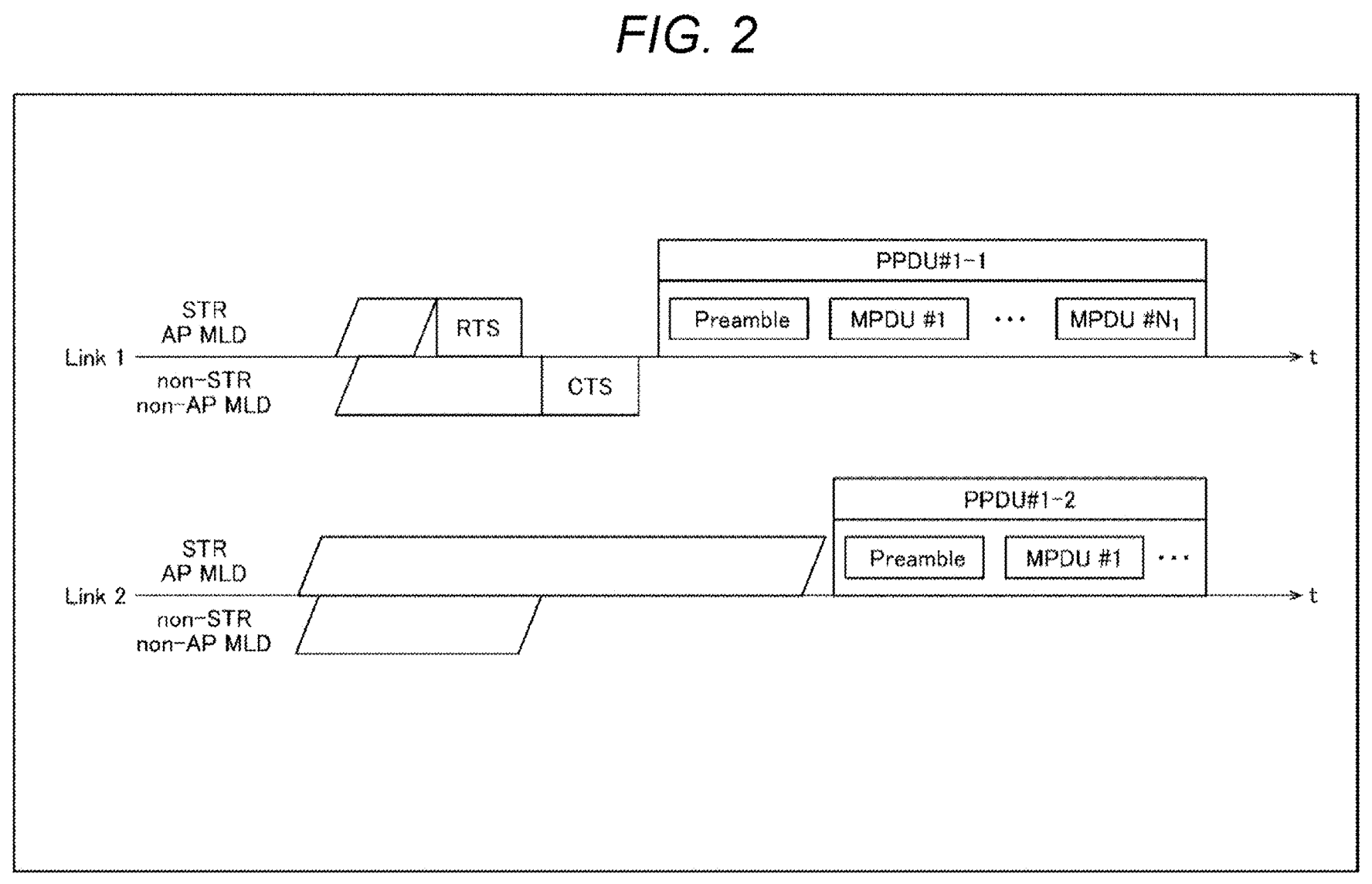

FIG. 1 illustrates a frame transmitted by each terminal in time series in a case where the method B is applied. FIG. 2 illustrates a frame transmitted by each terminal in time series in a case where the method C is applied.

FIGS. 1 and 2 illustrate a case where a STR AP MLD and a non-STR non-AP MLD transmit a data unit (PPDU) from the STR AP MLD to the non-STR non-AP MLD by using two links of the first link (Link 1) and the second link (Link 2). In FIGS. 1 and 2, the upper side of the time axis of each of the first link and the second link indicates a frame transmitted by the STR AP MLD, and the lower side of the time axis indicates a frame transmitted by the non-STR non-AP MLD.

FIG. 1 illustrates a case where a difference between the back-off expiration time on the first link and the back-off expiration time on the second link in the STR AP MLD is shorter than the transmission period of the RTS frame. At this time, on the second link, a CTS-A (Announcement) frame is transmitted from the STR AP MLD at the time when the CTS frame is transmitted from the non-STR non-AP MLD on the first link.

In the CTS-A frame, notification of the acquisition of the transmission right can be provided to the surroundings of the terminal that transmits the frame. When the RTS frame is used instead of the CTS-A frame, the non-STR non-AP MLD needs to transmit the CTS frame, but at this time, the CTS frame is transmitted on the second link within the reception period of a PPDU #1-1, and thus the constraint of NSTR cannot be satisfied.

Note that there may be a case where the CTS-A frame is not transmitted, but in this case, since a signal is not transmitted from the STR AP MLD or the non-STR non-AP MLD on the second link, there is a possibility that the transmission right is acquired from another terminal.

FIG. 2 illustrates a case where a difference between the back-off expiration time on the first link and the back-off expiration time on the second link in the STR AP MLD is longer than the transmission period of the RTS frame. At this time, on the second link, a data unit (PPDU) is transmitted without transmitting the RTS frame and the CTS frame.

Note that, strictly speaking, the case where the difference between the back-off expiration time on the first link and the back-off expiration time on the second link in the STR AP MLD is longer than the transmission period of the RTS frame and the transmission period of the CTS frame is illustrated, but the same applies to the "case where the time difference is longer than the transmission period of the RTS frame, but is shorter than the transmission period of the RTS frame and the CTS".

All the methods described so far are methods in which the STR AP MLD acquires the transmission right. That is, in all the methods A to C, it is assumed that a frame is transmitted after the back-off of the STR AP MLD expires.

However, actually, since arrangement of peripheral terminals and an expiration time of the back-off are randomly set, there is a case where the back-off of the non-STR non-AP MLD expires earlier than the STR AP MLD. In this case, for example, when the non-STR non-AP MLD acquires the transmission right, and the STR AP MLD triggers the data unit transmission and transmits the data unit within the transmission right, the following effects can be obtained.

That is, it is possible to increase an opportunity to acquire the transmission right on a plurality of the links in the non-STR non-AP MLD and improve a data rate in the system. However, the effect of the subsequent stage is essentially caused by suppressing the transmission standby time by diversifying the back-off counter.

Hereinafter, a link (first link (Link 1)) on which the STR AP MLD first transmits an RTS frame is defined as a basic link, and a link (second link (Link 2)) used for transmission by the STR AP MLD and non-STR non-AP MLD other than the basic link is defined as a support link.

In the present technology, the following method is proposed in order to solve the above-described current problem. That is, on the second link, in a case where the back-off counter of the non-STR non-AP MLD expires earlier than that of the STR AP MLD, notification of a control signal necessary for the non-STR non-AP MLD to acquire the transmission right on the second link is provided.

More specifically, the STR AP MLD transmits the RTS frame to the non-STR non-AP MLD by using the basic link, and transmits a Support Link CTS Trigger frame when the CTS frame is returned from the non-STR non-AP MLD. Therefore, on the support link, the non-STR non-AP MLD is triggered to acquire a transmission right.

Furthermore, in a case where notification of the Support Link CTS Trigger frame is provided from the STR AP MLD by using the basic link, the non-STR non-AP MLD returns a Support Link CTS-A frame by using the basic link, and at the same time, transmits the CTS-A frame by using the support link. Therefore, on the support link, the non-STR non-AP MLD can acquire the transmission right in advance.

Hereinafter, the embodiment of the present technology will be described with reference to the drawings.

1. Embodiment of the Present Technology

System Configuration Example

Figure 3:
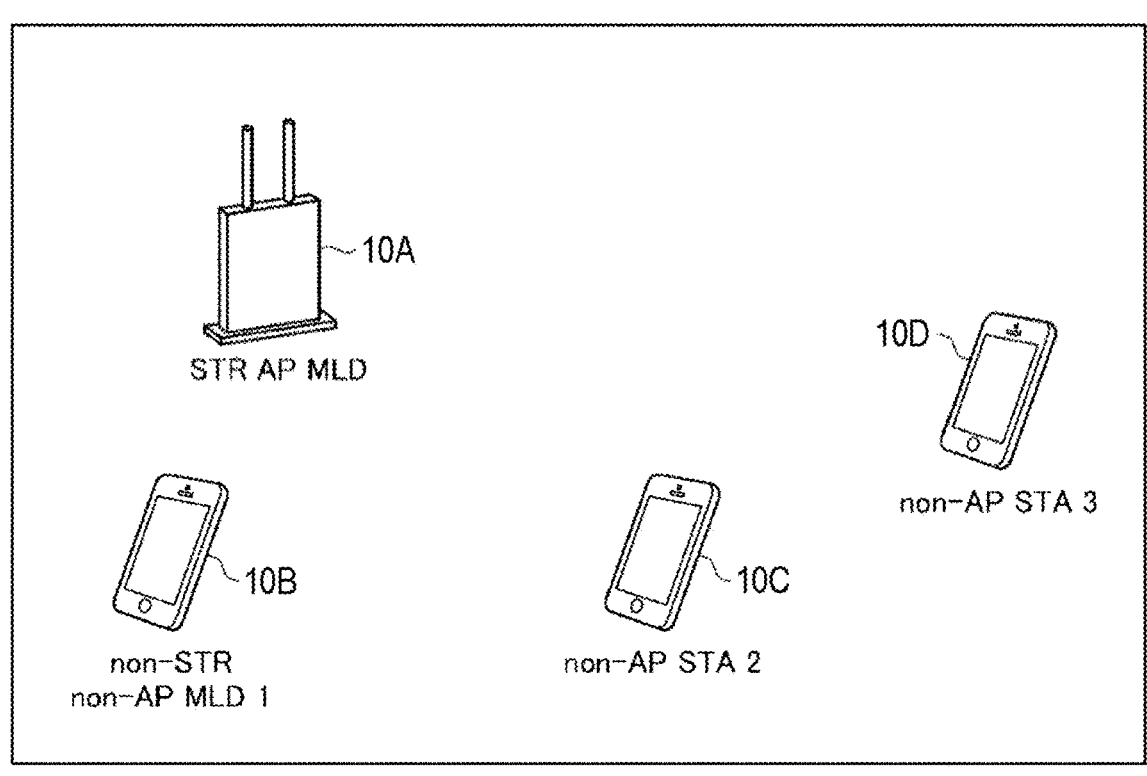
FIG. 3 is a diagram illustrating a configuration example of a wireless network system to which the present technology is applied.

FIG. 3 is a diagram illustrating a configuration example of a wireless network system to which the present technology is applied.

In FIG. 3, communication devices 10A to 10D exist in the wireless LAN system. The communication device 10A is a simultaneous transmit and receive, access point multi-link device (STR AP MLD). The communication device 10B is a non-simultaneous transmit and receive, non-access point multi-link device (non-STR non-AP MLD). The communication devices 10C and 10D are non-access point stations (non-AP STAs).

That is, in FIG. 3, in addition to the communication device 10B that is one non-STR non-AP MLD, the communication devices 10C and 10D, as the non-AP STAs that are terminals that are not access points, are connected to the communication device 10A that is one access point (STR AP MLD).

However, each of the non-AP STAs is a terminal that is any one of the non-STR non-AP MLD, the STR non-AP MLD, or the non-AP STA that is not the MLD. FIG. 3 illustrates a case where there are two non-AP STAs (non-AP STA 2, non-AP STA 3), but the number of non-AP STAs may not be limited. That is, there may be no other non-AP STAs than the non-STR non-AP MLD (in FIG. 3, non-STR non-AP MLD 1), or there may be one to three or more non-AP STAs in addition to the non-STR non-AP MLD.

Note that in the description below, the set of non-AP STAs other than the non-STR non-AP MLD 1 is referred to as STAs, and the STAs indicate one or more non-AP STAs unless otherwise specified. Furthermore, there exists a plurality of links on which the non-STR non-AP MLD 1 can perform transmission to the STR AP MLD, and each non-AP STA of the non-AP STAs can perform transmission to the STR AP MLD on one or more links. However, the links in which the non-AP STAs can perform transmission are not necessarily the same.

Device Configuration Example

Figure 4:
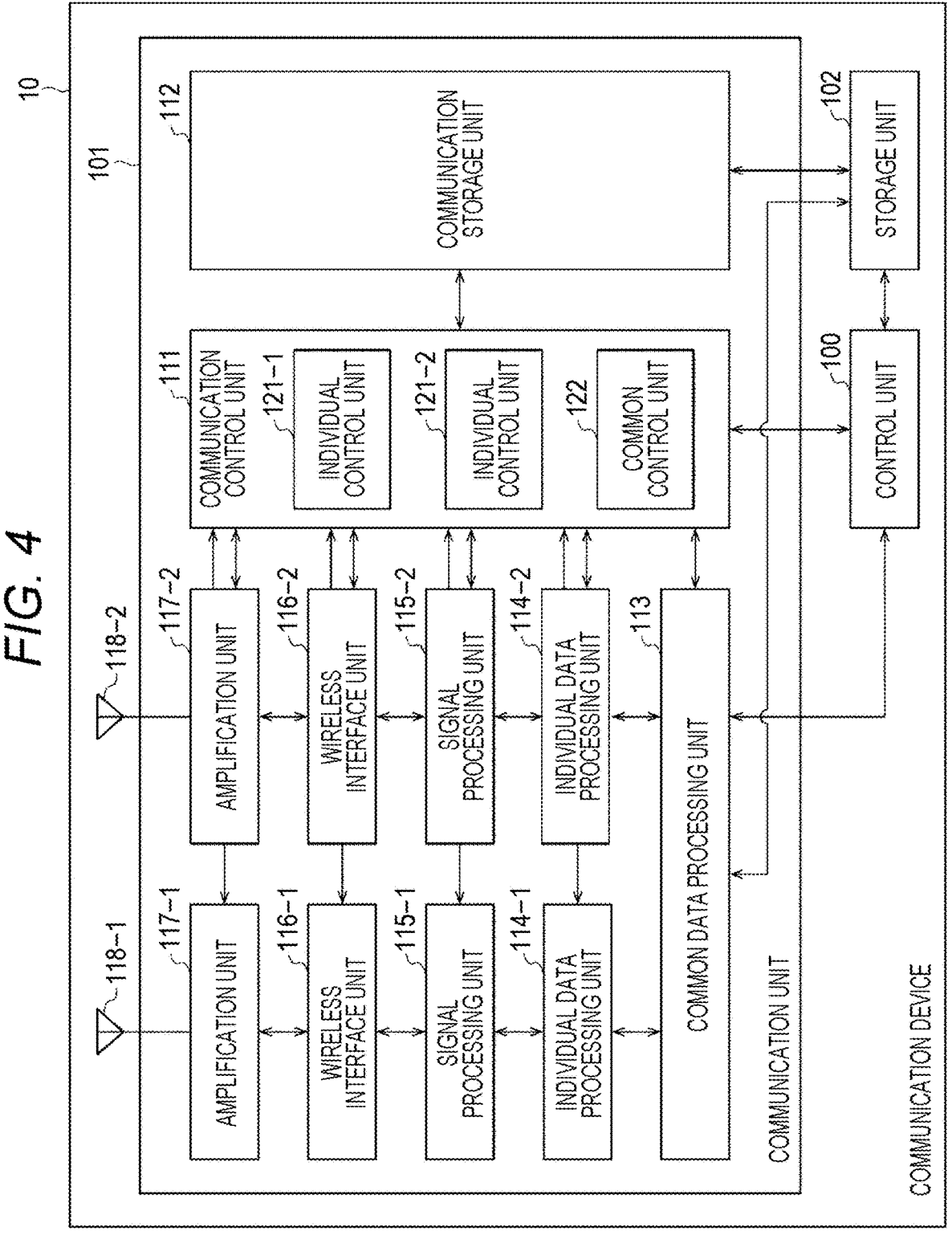
FIG. 4 is a block diagram illustrating a configuration example of a communication device to which the present technology is applied.

FIG. 4 is a block diagram illustrating a configuration example of a communication device to which the present technology is applied.

A communication device 10 is a communication device that performs wireless communication, and corresponds to the communication device 10A or the communication device 10B in FIG. 3. In FIG. 4, the communication device 10 includes a control unit 100, a communication unit 101, and a storage unit 102. Antennas 118-1 and 118-2 are connected to the communication unit 101.

The communication unit 101 includes a communication control unit 111, a communication storage unit 112, a common data processing unit 113, individual data processing units 114-1 and 114-2, signal processing units 115-1 and 115-2, wireless interface units 116-1 and 116-2, and amplification units 117-1 and 117-2. The amplification unit 117-1 is connected to the antenna 118-1, and the amplification unit 117-2 is connected to the antenna 118-2. The communication unit 101 is the AP MLD or the non-AP MLD, and can have a configuration similar to that of the AP MLD or non-AP MLD.

The individual data processing unit 114-1, the signal processing unit 115-1, the wireless interface unit 116-1, the amplification unit 117-1, and the antenna 118-1 form one set, and the individual data processing unit 114-2, the signal processing unit 115-2, the wireless interface unit 116-2, the amplification unit 117-2, and the antenna 118-2 form one set. These sets are individual communication sets, two or more sets serve as components of the communication device 10, and each of the individual communication sets performs wireless communication on each link.

Furthermore, each individual communication set may include a storage unit. Note that a link is a wireless transmission path through which data can be transmitted between two communication devices, and the links that are used by the individual communication sets may have different frequency bands. Furthermore, the individual data processing unit 114 and the signal processing unit 115 may be configured as one set, and two or more sets may be connected to one wireless interface unit 116.

The communication control unit 111 controls operation of each unit and information transmission between the units. Furthermore, the communication control unit 111 performs control to transfer, to a data processing unit, control information and management information notification of which is to be provided to another communication device.

The communication control unit 111 includes individual control units 121-1 and 121-2 that control each individual communication set, and a common control unit 122 that performs control common to the common data processing unit 113 and each individual communication set.

The individual control unit 121-1 transmits, to another individual control unit 121-2, information (for example, PHY-RXEND.indication) indicating the period during which the data unit in its own individual communication set is received or the completion of reception of the data unit on the basis of control information (for example, LENGTH or information to which the present technology is applied) included in a received data unit. These pieces of information may be transmitted via the common control unit 122. The individual control unit 121-2 is configured similar to the individual control unit 121-1. In the communication unit 101 to which the present technology is applied, the signal reception period can be controlled between the individual communication sets or the individual control units during reception of signals from a plurality of the links. Note that as LENGTH and PHY-RXEND.indication, information disclosed in Document 2 can be used.

The communication storage unit 112 includes a memory and a buffer, and holds information used by the communication control unit 111. Furthermore, the communication storage unit 112 holds data to be transmitted and data received.

The common data processing unit 113, the individual data processing unit 114-1, and the individual data processing unit 114-2 constitute a data processing unit.

At the time of transmission, the common data processing unit 113 performs sequence management of the data held in the communication storage unit 112 and the control information and management information received from the communication control unit 111, performs encryption processing to generate a data unit, and performs allocation to the individual data processing units 114-1 and 114-2. At the time of reception, the common data processing unit 113 performs decryption processing and reorder processing on the data unit.

At the time of transmission, the individual data processing unit 114-1 performs channel access operation based on carrier sensing, adds a media access control (MAC) header and an error detection code to data to be transmitted, and performs multiple concatenation processing of the data units. Furthermore, at the time of reception, the individual data processing unit 114-1 decouples the MAC header from the received data unit, performs analysis and error detection on the received data unit, and performs a retransmission request operation of the received data unit. Since the individual data processing unit 114-2 is configured similar to the individual data processing unit 114-1, the description thereof will be omitted.

Note that the operations of the common data processing unit 113 and individual data processing units 114-1 and 114-2 are not limited to the above-described operations, and for example, one data processing unit may perform the operation of the other data processing unit.

At the time of transmission, the signal processing unit 115-1 performs encoding, interleaving, modulation, and the like on the data unit, and add a physical header, to generate a symbol stream. Furthermore, at the time of reception, the signal processing unit 115-1 analyzes the physical header, perform demodulation, deinterleaving, decoding, and the like on the symbol stream, and generate a data unit. The signal processing unit 115-1 estimates complex channel characteristic and performs spatial separation processing as necessary. Since the signal processing unit 115-2 is configured similar to the signal processing unit 115-1, the description thereof will be omitted.

At the time of transmission, the wireless interface unit 116-1 performs digital-analog signal conversion, filtering, up-conversion, and phase control on the symbol stream, and generate a transmission signal. Furthermore, at the time of reception, the wireless interface unit 116-1 performs down-conversion, filtering, and analog-digital signal conversion on the reception signal, and generate a symbol stream. Since the wireless interface unit 116-2 is configured similar to the wireless interface unit 116-1, the description thereof will be omitted.

The amplification unit 117-1 amplifies a signal input from the wireless interface unit 116-1 or the antenna 118-1. The amplification unit 117-1 may partially be a component outside the communication unit 101. Furthermore, the amplification unit 117-1 may be partially included in the wireless interface unit 116-1. Since the amplification unit 117-2 is configured similar to the amplification unit 117-1, the description thereof will be omitted.

The control unit 100 controls the communication unit 101 and the communication control unit 111. Furthermore, the control unit 100 may perform part of the operation of the communication control unit 111 instead. The control unit 100 and the communication control unit 111 may be configured as one block.

The storage unit 102 includes a memory, and holds information used by the control unit 100 and the communication unit 101. Furthermore, the storage unit 102 may perform part of the operation of the communication storage unit 112 instead. The storage unit 102 and the communication storage unit 112 may be configured as one block.

Note that in FIG. 4, the wireless interface unit 116, the amplification unit 117, and the antenna 118 may form one set, and two or more sets may be components of the communication device 10. The communication unit 101 can be realized by one or more LSIs. The common data processing unit 113 is also referred to as Upper MAC or Higher MAC, and the individual data processing unit 114 is also referred to as Lower MAC. A set of the individual data processing unit 114 and the signal processing unit 115 is also referred to as an AP entity or a non-AP entity. The communication control unit 111 is also referred to as an MLD management entity.

Entire Sequence Example

Figure 5:
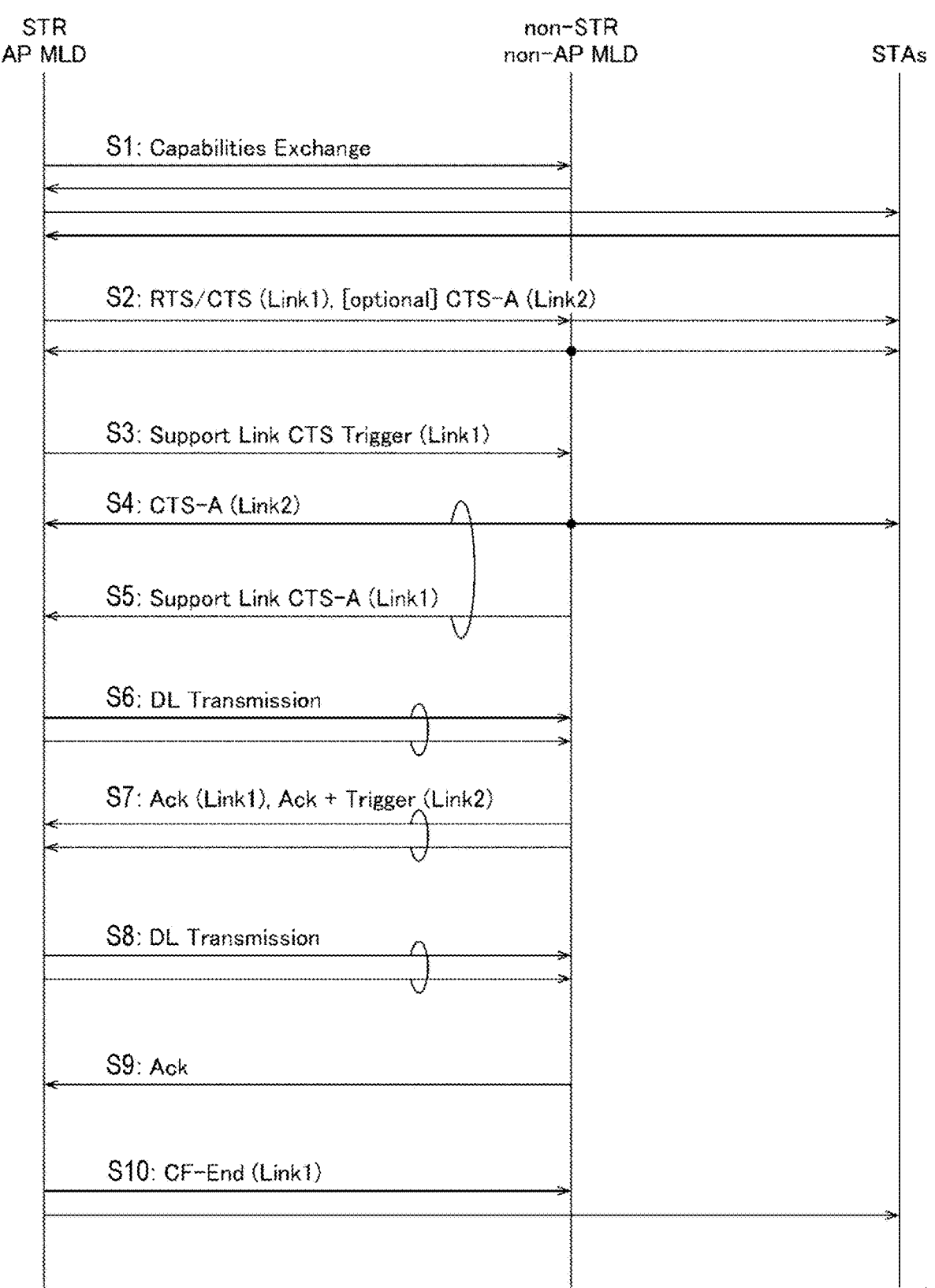
FIG. 5 is a diagram illustrating an example of an entire sequence.

FIG. 5 is a diagram illustrating an example of an entire sequence in which exchange of signals between devices is indicated along a time axis.

In FIG. 5, similarly to the configuration example of FIG. 3, it is assumed that there are one STR AP MLD, one non-STR non-AP MLD, and one or a plurality of STAs. Furthermore, in FIG. 5, the first link (Link 1) is a basic link, and the second link (Link 2) is a support link.

First, the STR AP MLD and the non-STR non-AP MLD notify each other of information indicating capability of each terminal, and exchange information indicating capability of each terminal (S1: capabilities exchange).

After the back-off on the first link expires, the STR AP MLD transmits an RTS frame to the non-STR non-AP MLD by using the first link (S2: RTS (Link 1)). The non-STR non-AP MLD that has received the RTS frame transmits a CTS frame to the STR AP MLD by using the first link (S2: CTS (Link 1)). Note that in a case where the back-off on the second link expires, the non-STR non-AP MLD may transmit a CTS-A frame to the STAs by using the second link (S2: optional: CTS-A (Link 2)).

The STR AP MLD that has received the CTS frame transmits a Support Link CTS Trigger frame to the non-STR non-AP MLD by using the first link, and notifies the non-STR non-AP MLD of a request for acquiring a transmission opportunity on the second link (S3: Support Link CTS Trigger (Link 1)).

The non-STR non-AP MLD that has received the Support Link CTS Trigger frame transmits a CTS-A frame to the STR AP MLD and the STAs by using the second link to acquire a transmission opportunity on the second link (S4: CTS-A (Link 2)). Furthermore, the non-STR non-AP MLD transmits a Support Link CTS-A frame to the STR AP MLD by using the first link (S5: Support Link CTS-A (Link 1)).

After notification of the Support Link CTS-A frame from the non-STR non-AP MLD, the STR AP MLD performs data transmission to the non-STR non-AP MLD (S6: DL Transmission). The non-STR non-AP MLD transmits Ack as an acknowledgement of the data transmitted from the STR AP MLD by using the first link (S7: Ack (Link 1)). Furthermore, the non-STR non-AP MLD transmits a frame (hereinafter, referred to as an Ack+Trigger frame) including transmission trigger information by using the second link (S7: Ack+Trigger (Link 2)).

Thereafter, data transmission from the STR AP MLD to the non-STR non-AP MLD is performed (S8: DL Transmission), and Ack as the acknowledgement is transmitted from the non-STR non-AP MLD to the STR AP MLD (S9: Ack).

Figure 6:
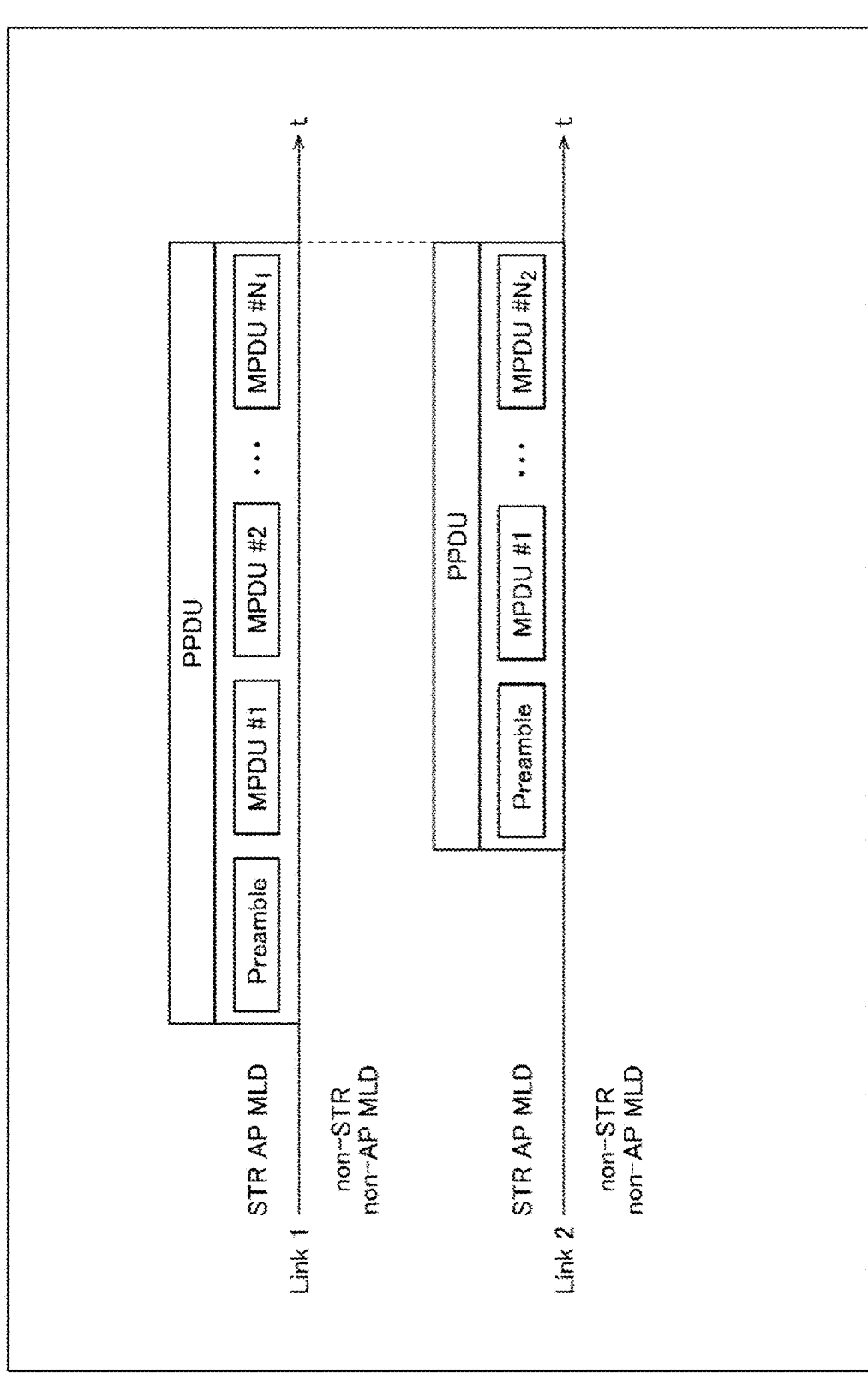
FIG. 6 is a diagram illustrating a transmission example in DL transmission.

In the downlink (DL) transmission, as described above, transmission on another link occurs during the transmission on the first link. FIG. 6 is a diagram illustrating a transmission example in the DL transmission. FIG. 6 illustrates an example in which there are two links of the first link (Link l) and the second link (Link 2), and the transmission on the second link occurs after the transmission on the first link is started.

The STR AP MLD transmits a data unit (PPDU) on the first link. In the PPDU, control information including information indicating a length of the PPDU is included in a preamble which is a head portion of the PPDU. The preamble is followed by a MAC protocol data unit (MPDU) as data.

Note that the transmission completion time and reception completion time of each PPDU are aligned due to the restriction of the non-STR non-AP MLD serving as a reception terminal. However, these completion times are only required to fall within a predetermined time range and, for example, an error is allowed to occur within the range of 16 microseconds.

Returning to FIG. 5, the STR AP MLD notifies the non-STR non-AP MLD and the STAs of the release of the transmission right acquired on the first link by transmitting a contention free frame (CF-End) (S10: CF-End (Link l)).

Note that FIG. 5 mainly illustrates a sequence in transmission from the STR AP MLD and the non-STR non-AP MLD, but does not illustrate a sequence in transmission from the STAs except for the capabilities exchange (S1). This is the reason why FIG. 5 illustrates an example in which the STR AP MLD or the non-STR non-AP MLD acquires a transmission right prior to the STAs, and performs each transmission operation. Although not illustrated, transmission of the data unit from the STAs or transmission of the data unit to the STAs may occur, and for example, the DL transmission (S6) may be performed after transmission is performed between the STR AP MLD and some STAs immediately after the capabilities exchange (S1).

Furthermore, FIG. 5 illustrates a case where in the capabilities exchange (S1), the STR AP MLD performs the capabilities exchange with respect to the non-STR non-AP MLD, but transmission may be simultaneously performed with respect to the non-STR non-AP MLD and the STAs. For example, the transmission can be performed by using a beacon signal the STR AP MLD periodically transmits to a plurality of surrounding terminals. FIG. 5 illustrates a case where the capabilities exchange (S1) is performed between the STR AP MLD and the non-STR non-AP MLD and then the capabilities exchange is performed between the STR AP MLD and the STAs. However, the order of implementation is not limited, and the order of implementation may be reversed.

The sequence in FIG. 5 may be partially omitted as necessary, and the order may not be as illustrated in the figure. For example, when it is determined that Ack is unnecessary in accordance with the type of data to be transmitted, it is not necessary to exchange Ack. Furthermore, for example, Ack exchanged immediately after DL transmission (S6, S8) or UL transmission does not necessarily need to be performed at this timing, and, for example, may be collectively performed immediately before CF-End (S10).

Hereinafter, as details of each sequence in FIG. 5, the transmission example and configuration example of the frame notification of which is provided in each sequence will be described.

(S1: Capabilities Exchange)

In the capabilities exchange, the STR AP MLD and the non-STR non-AP MLD notify each other of information regarding the capability of the terminal itself. The capability described herein indicates whether or not the terminal can perform STR transmission and the number of links on which transmission can be performed simultaneously, but the capability is not limited to these aspects.

For example, the capability exchange may be performed by being included in a beacon signal that is periodically transmitted by each terminal or included in information notification (Association) for establishing connection between terminals after the beacon signal.

Figure 7:
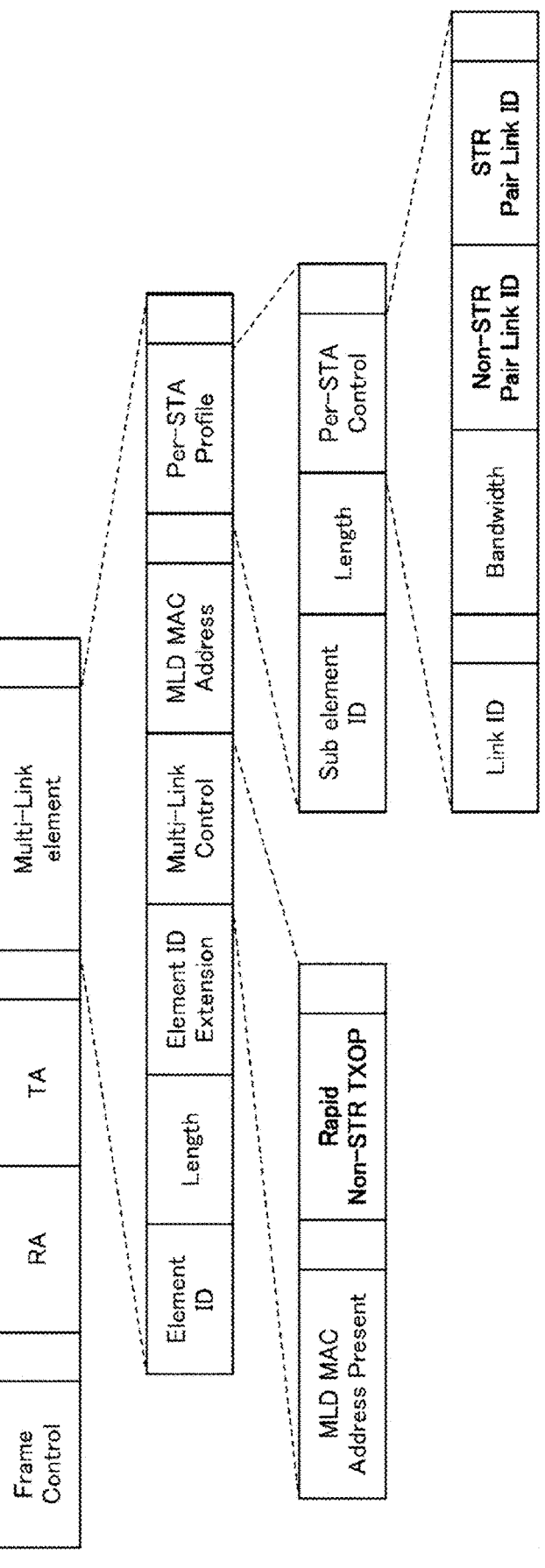
FIG. 7 is a diagram illustrating a configuration example of a frame notification of which is provided in capabilities exchange.

FIG. 7 is a diagram illustrating a configuration example of the frame notification of which is provided in the capabilities exchange.

The frame notification of which is provided in the capabilities exchange includes Frame Control, Receiving STA address (RA), Transmitting STA address (TA), and Multi-Link element. The components of the frame are not limited thereto, and other components may be included.

Frame Control includes information indicating that the frame is a frame notification of which is provided in the capabilities exchange. RA and TA respectively include information indicating a transmission source terminal and a destination terminal.

For example, in RA and TA, Media Access Control (MAC) address specific to the terminal may be indicated. Furthermore, in particular, in a case where the transmission source terminal and the destination terminal are the MLDs, a plurality of the MAC addresses may be allocated to one MLD.

Specifically, the MAC addresses may be allocated to the individual communication set in one MLD or each link used by one MLD. That is, RA and TA do not indicate only the MLD, but are information for identifying the individual communication set of the MLD or the link, in addition to the MLD that transmits the frame. Note that the individual communication set or the link may be identified together with MLD MAC Address in Multi-Link element as will be described later.

Multi-Link element includes information indicating a link that can be used as a link for the terminal itself that transmits the frame, information indicating a link that can be simultaneously used as STR, and information indicating a link that can be used as NSTR.

Multi-Link element includes fields of Element ID, Length, Element ID Extension, Multi-Link Control, MLD MAC Address, and Per-STA Profile.

Element ID includes information indicating that the element is Multi-Link element. When the information is stored, Element ID Extension may be used together with Element ID. Length includes information indicating the bit length of Multi-Link element.

Multi-Link Control includes information indicating the presence or absence of subsequent MLD MAC Address and information indicating that downlink transmission can be performed even when the transmission right is acquired on the second link. MLD MAC Address includes identification information individually allocated to the MLD terminal, regardless of the link or the individual communication set. Per-STA Profile includes information regarding each link or each individual communication set.

Multi-Link Control includes subfields of MLD MAC Address Present and Rapid Non-STR TXOP.

MLD MAC Address Present includes information indicating that MLD MAC Address is present. Rapid Non-STR TXOP includes information to be described in the following (a) and (b).

(a) In a case where the terminal that transmits the frame is an STR AP MLD, information indicating that a data unit can be transmitted according to a control signal notification of which is provided by a non-STR non-AP MLD even when the non-STR non-AP MLD acquires a transmission right on the second link (b) In a case where the terminal that transmits the frame is a non-STR non-AP MLD, information indicating that a control signal triggering transmission of a data unit can be transmitted to an STR AP MLD even when a transmission right is acquired on the second link, and information indicating that the data unit transmitted from the STR AP MLD can be received after the control signal is transmitted Per-STA Profile includes subfields of Sub element ID, Length, and Per-STA Control.

Sub element ID includes information indicating that the subfield is Per-STA Profile. Length includes information indicating the bit length of Per-STA Profile. Per-STA Control includes information regarding a target link or an individual communication set, which is indicated by Per-STA Profile. Note that there may be a plurality of Per-STA Profiles, and information regarding different links or individual communication sets is indicated.

Per-STA Control further includes subfields of Link ID, Bandwidth, Non-STR Pair Link ID, and STR Pair Link ID.

Link ID includes information indicating the target link or individual communication set. Bandwidth includes information indicating a link indicated by Link ID or information indicating a frequency band in which the individual communication set can perform transmission.

Non-STR Pair Link ID includes information indicating a link on which an individual communication set operates as the non-STR MLD or an individual communication set in a case of being used together with the link indicated by Link ID or the individual communication set.

For example, in a case where information indicating a first link (Link 1) is included in Link ID, and information indicating a second link (Link 2) is included in Non-STR Pair Link ID, when reception (or transmission) is performed by using the first link and the second link at the same time, it can be understood that the terminal that provides notification of the frame needs to perform transmission that satisfies the operation restriction as the non-STR MLD.

STR Pair Link ID includes information indicating a link on which an individual communication set operates as the non-STR MLD or an individual communication set in a case of being used together with the link indicated by Link ID or the individual communication set.

Figure 8:
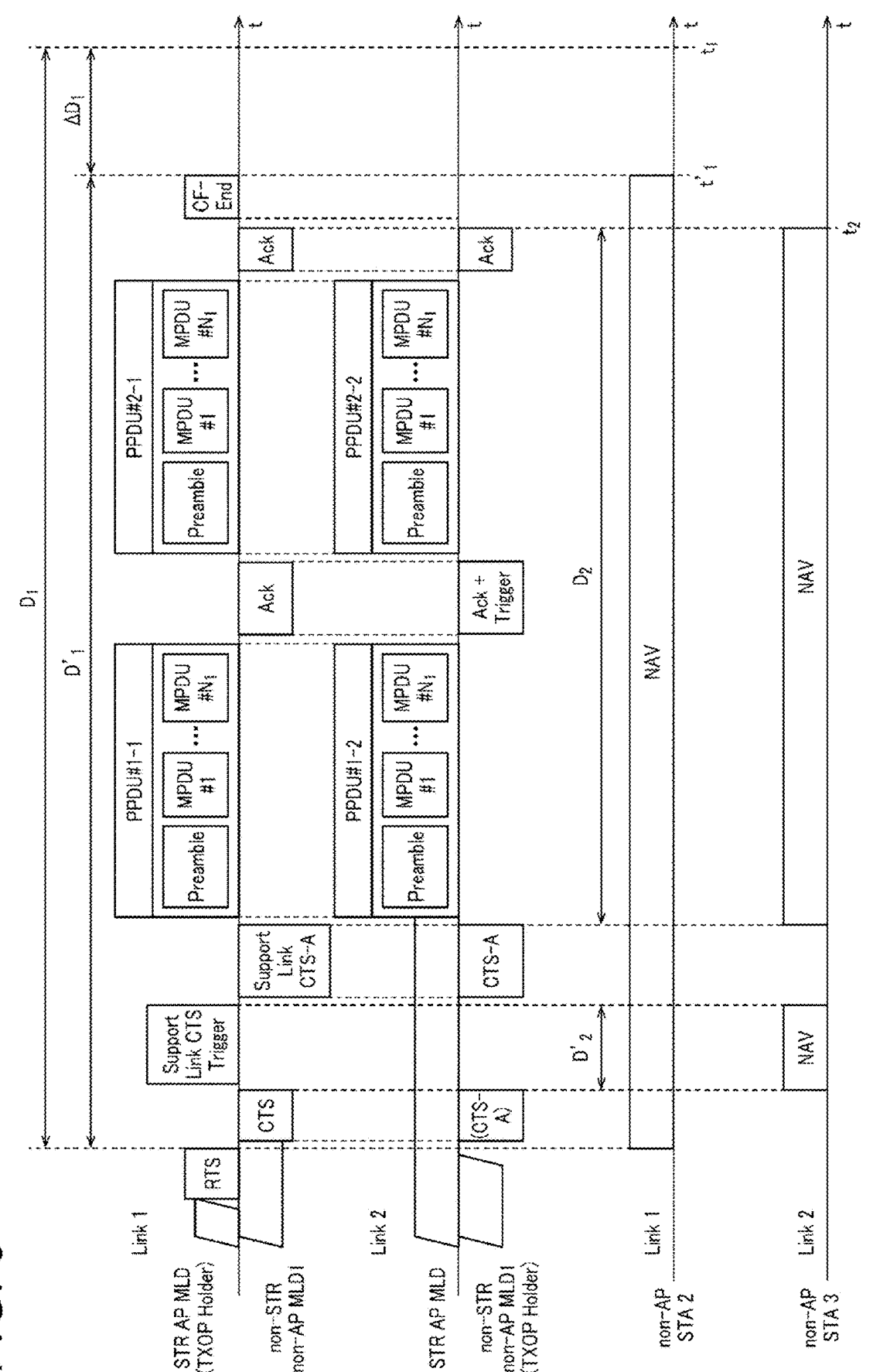
FIG. 8 is a diagram illustrating a frame transmitted by each terminal in time series in a series of processing after capabilities exchange.

In the capabilities exchange, the AP MLD and the non-STR non-AP MLD, which have notified each other of their capabilities, acquire the transmission right and transmit the data unit. FIG. 8 illustrates a frame transmitted by each terminal in time series in a series of processing (S2 to S10) after the capabilities exchange.

In FIG. 8, similarly to the configuration example of FIG. 3, there are one STR AP MLD, one non-STR non-AP MLD 1, and a non-AP STA 2 and non-AP STA 3 as a plurality of STAs. In FIG. 8, in two time series on the upper side, the upper side of the time axis of each of the first link (Link 1) and the second link (Link 2) indicates a frame transmitted by the STR AP MLD, and the lower side of the time axis indicates a frame transmitted by the non-STR non-AP MLD 1. The first link (Link 1) is a basic link, and the second link (Link 2) is a support link. Furthermore, in FIG. 8, two time series on the lower side indicate a state in which the first link is used by the non-AP STA 2 and a state in which the second link is used by the non-AP STA 3.

Hereinafter, a series of processing (S2 to S10) after the capabilities exchange will be described with reference to the time series of FIG. 8 as appropriate.

(S2: RTS/CTS (Link 1), CTS-A (Link 2))

The STR AP MLD of which back-off has expired on the first link transmits an RTS frame to the non-STR non-AP MLD 1. The RTS frame includes information indicating a request for acquiring a transmission right in a period $D_1$ (FIG. 8) in communication with the non-STR non-AP MLD 1.

The non-STR non-AP MLD 1 that has received the RTS frame on the first link transmits a CTS frame to the STR AP MLD by using the first link. The CTS frame includes information indicating that acquisition of the transmission right is allowed (approved) for the RTS frame from the STR AP MLD upon reception of the notification of the RTS frame.

At this time, in a case where the back-off of the non-STR non-AP MLD1 has expired on the second link, the non-STR non-AP MLD 1 may transmit a CTS-A frame to surrounding terminals. The CTS-A frame transmitted on the second link includes information indicating that a transmission right in a period $D_2'$ (FIG. 8) is acquired.

Among the terminals that have received the RTS frame and the CTS frame, a terminal other than the STR AP MLD or the non-STR non-AP MLD 1 refrains from transmission in a period indicated by each frame. For example, the terminals that have received the RTS frame and CTS frame transmitted on the first link refrain from transmission in the period D1 (or the period until time t1) in FIG. 8.

Here, the RTS frame and the CTS frame correspond to the RTS frame and CTS frame disclosed in Document 2 described above. Furthermore, in Document 2, a period during which the terminal other than the STR AP MLD or the non-STR non-AP MLD 1 refrains from transmission is referred to as a network allocation vector (NAV), and as illustrated in FIG. 8, for example, the non-AP STA 2 connected to the STR AP MLD on the first link sets this period as NAV.

(S3: Support Link CTS Trigger (Link 1))

On the first link, the STR AP MLD that has received the CTS frame transmitted from the non-STR non-AP MLD 1 transmits a Support Link CTS Trigger frame to the non-STR non-AP MLD 1 by using the first link.

Figure 9:
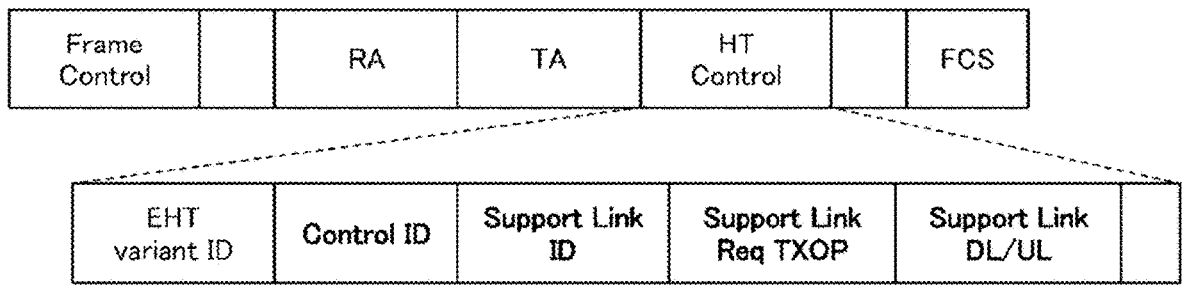
FIG. 9 is a diagram illustrating a configuration example of a Support Link CTS Trigger frame.

FIG. 9 is a diagram illustrating a configuration example of the Support Link CTS Trigger frame.

The Support Link CTS Trigger frame includes Frame Control, RA, TA, High Throughput (HT) Control, and Frame Check Sequence (FCS). The components of the frame are not limited thereto, and other components may be included.

Frame Control includes information indicating that the frame is a Support Link CTS Trigger frame.

Note that, as will be described later, the information included in the Frame Control field may include information indicating that the frame is the Support Link CTS Trigger frame by being combined with information included in EHT variant ID or Control ID in HT Control. That is, the terminal that has received the frame can interpret that the frame is the Support Link CTS Trigger frame on the basis of the information included in Frame Control, EHT variant ID, and Control ID.

RA and TA respectively include information indicating a transmission source terminal and a destination terminal. For example, a MAC address specific to the terminal may be indicated in RA and TA. Furthermore, in particular, in a case where the transmission source terminal and the destination terminal are MLDs, RA and TA may be MAC addresses defined for each individual communication set of the terminal or each link used by the terminal, and in addition, may be MAC addresses identified as MLDs.

HT Control includes a link for transmitting the CTS frame to a reception terminal and information regarding a transmission right acquired with the CTS frame. FCS includes parity information for performing error correction on the information included in the frame by the reception terminal.

HT Control includes fields of EHT variant ID, Control ID, Support Link ID, Support Link Req TXOP, and Support Link DL/UL.

EHT variant ID and Control ID include information indicating that the frame is a Support Link CTS Trigger indicating in Frame Control. Support Link ID includes information indicating a link for requesting the destination terminal to transmit the CTS-A frame.

Support Link Req TXOP includes information indicating a transmission right (or a transmission period, for example, a period $D_2$ in FIG. 8) acquired with the requested CTS-A frame.

Support Link DL/UL includes information indicating permission to transmit a data unit (PPDU) on the first link and the second link for the destination terminal (non-STR non-AP MLD 1). That is, after the frame is transmitted, the Support Link CTS-A frame is transmitted from the non-STR non-AP MLD 1 by using the first link, and Support Link DL/UL includes information indicating permission to transmit the data unit (PPDU) by using the first link and the second link for the non-STR non-AP MLD 1 in the subsequent transmission.

Note that, FIG. 9 illustrates a configuration in which the fields of Support Link ID and Support Link Req TXOP are included in HT Control. However, the fields are not essentially required to be included in HT Control, and may be included in another field. Furthermore, EHT variant ID and Control ID may be defined as one field.

(S4: CTS-A (Link 2), S5: Support Link CTS-A (Link 1))

The non-STR non-AP MLD 1 that has received the Support Link CTS Trigger transmits a Support Link CTS-A frame by using the first link and transmits a CTS-A frame by using the second link.

Figure 10:
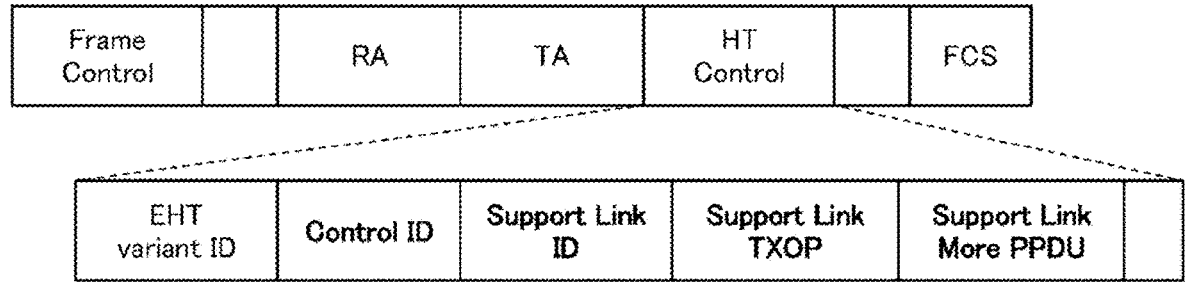
FIG. 10 is a diagram illustrating a configuration example of a Support Link CTS-A frame.

FIG. 10 is a diagram illustrating a configuration example of the Support Link CTS-A frame.

The Support Link CTS-A frame includes Frame Control, RA, TA, HT Control, and FCS. The components of the frame are not limited thereto, and other components may be included.

Frame Control includes information indicating that the frame is a Support Link CTS-A frame. Note that, as will be described later, the information included in the Frame Control field may include information indicating that the frame is the Support Link CTS-A frame by being combined with information included in EHT variant ID or Control ID in HT Control. That is, the terminal that has received the frame can interpret that the frame is the Support Link CTS-A frame on the basis of the information included in Frame Control, EHT variant ID, and Control ID.

RA and TA respectively include information indicating a transmission source terminal and a destination terminal. For example, a MAC address specific to the terminal may be indicated in RA and TA. Furthermore, in particular, in a case where the transmission source terminal and the destination terminal are MLDs, RA and TA may be MAC addresses defined for each individual communication set of the terminal or each link used by the terminal, and in addition, may be MAC addresses identified as MLDs.

HT Control includes a link for transmitting the CTS frame to a reception terminal and information regarding a transmission right acquired with the CTS frame. FCS includes parity information for performing error correction on the information included in the frame by the reception terminal.

HT Control includes fields of EHT variant ID, Control ID, Support Link ID, Support Link TXOP, Support Link More PPDU.

EHT variant ID and Control ID include information indicating that the frame is a Support Link CTS-A frame in Frame Control. Support Link ID includes information indicating a link through which the terminal transmitting the frame transmits the CTS-A frame.

Support Link TXOP includes information indicating a transmission right (or a transmission period, for example, the period $D_2$ in FIG. 8) acquired by the terminal that transmits the frame by using the CTS-A frame.

Support Link More PPDU includes information indicating whether or not the terminal that transmits the frame transmits the data unit (PPDU) immediately after transmitting the frame on the link indicated by Support Link ID in the frame.

Note that information indicating a transmission right included in Support Link TXOP does not necessarily match Support Link Req TXOP in the Support Link CTS Trigger notification of which is provided immediately before, and similarly, information indicating a link included in Support Link ID does not necessarily match Support Link ID in the Support Link CTS Trigger notification of which is provided immediately before.

Furthermore, only in a case where the Support Link DL/UL in the Support Link CTS Trigger notification of which is provided from the STR AP MLD that is the destination terminal of the frame includes information indicating that the transmission of the data to the non-STR non-AP MLD 1 is permitted and the non-STR non-AP MLD 1 holds at least the data unit to be transmitted to the STR AP MLD, information included in Support Link More PPDU can include information indicating that the data unit is transmitted immediately after the frame is transmitted.

Furthermore, FIG. 10 illustrates a configuration in which the fields of Support Link ID and Support Link TXOP are included in HT Control. However, the fields are not essentially required to be included in HT Control, and may be included in another field. In addition, EHT variant ID and Control ID are defined as one field.

Next, a configuration example of the CTS-A frame will be described. The configuration of the CTS-A frame transmitted using the second link can be similar to the configuration of the CTS frame disclosed in Document 2. However, the CTS-A frame includes information indicating that a transmission right is acquired in the period indicated by Support Link Req TXOP in the Support Link CTS Trigger notification of which is provided immediately before on the link indicated by Support Link ID in the Support Link CTS Trigger notification of which is provided immediately before.

FIG. 8 illustrates a case where the "link indicated by Support Link ID in the Support Link CTS Trigger notification of which is provided immediately before" is a "second link (Link 2)", and the "period indicated by Support Link Req TXOP in the Support Link CTS Trigger notification of which is provided immediately before" is a "period $D_2$". At this time, among the terminals that have received the CTS-A frame on the second link, a terminal other than the STR AP MLD sets this period $D_2$ to NAV and refrains from transmission.

Note that Document 2 describes that information indicating extension of TXOP may be included in an arbitrary frame. FIG. 8 illustrates a case where a transmission right is acquired during the period $D_2$ with the CTS-A frame. However, after the transmission of the CTS-A frame, TXOP may be extended by transmitting a frame including information indicating extension of TXOP on the second link. For example, although TXOP in a period shorter than the period $D_2$ is acquired in the CTS-A frame, the transmission right may be acquired in the period $D_2$ with a frame transmitted after the CTS-A frame.

Furthermore, in a case where the STR AP MLD that has provided notification of the Support Link CTS Trigger frame fails to correctly receive the CTS-A frame from the non-STR non-AP MLD 1 on the second link within a specific time from the transmission completion time of the Support Link CTS Trigger frame, the STR AP MLD may provide notification of the Support Link CTS Trigger frame again.

At this time, according to the Support Link CTS Trigger frame notification of which is provided again, the non-STR non-AP MLD 1 may transmit the Support Link CTS-A frame by using the first link and the CTS-A frame by using the second link again in the similar manner as described above. However, the transmission right (or the transmission period) acquired with the CTS-A frame can indicate the same time as the end time of the transmission right (or the transmission period) notification of which is provided in the CTS-A frame implemented first.

(S6: DL Transmission, S7: Ack (Link 1), Ack+Trigger (Link 2))

After notification of the Support Link CTS-A frame is provided from the non-STR non-AP MLD 1 by using the first link, either downlink (DL) transmission or uplink (UL) transmission is performed. The DL transmission is transmission of a data unit from the STR AP MLD to the non-STR non-AP MLD 1. The UL transmission is transmission of a data unit from the non-STR non-AP MLD 1 to the STR AP MLD.

At this time, for example, uplink (UL) or downlink (DL) between the STR AP MLD and the non-STR non-AP MLD 1 can be performed as below.

The case where the downlink (DL) is performed is a case where information indicating "transmitting the data unit after the Support Link More PPDU frame" is included in Support Link More PPDU in the Support Link CTS-A frame notification of which is provided from the non-STR non-AP MLD on the first link immediately before.

The case where the uplink (UL) is performed is a case where information indicating "not transmitting the data unit after the Support Link More PPDU frame" is included in Support Link More PPDU in the Support Link CTS-A frame notification of which is provided from the non-STR non-AP MLD on the first link immediately before.

Note that in a case where the uplink (UL) is performed, in the non-STR non-AP MLD 1, the sequence number which is assigned to the MPDU transmitted on each link may be consecutive, and a set of arbitrary sequence numbers which are assigned to the MPDUs transmitted on the first link may be smaller than the arbitrary sequence number transmitted on another link.

In a case where the STR AP MLD fails to correctly receive the CTS-A frame on the second link, the CTS-A frame may also fail to be correctly received as in the uplink (UL). In a retransmission request generated at this time, notification of the sequence number of the MPDU which fails to be received correctly is provided, but when consecutive numbers are not assigned on the first link, a field length indicating the sequence number to be requested for retransmission is prevented from being increased.

FIG. 8 illustrates a case where the downlink (DL) is continuously performed. At this time, on the second link, the entity that has acquired the transmission right is not the STR AP MLD but the non-STR AP MLD 1. At this time, on the second link, the non-STR non-AP MLD 1 that has acquired the transmission right needs to provide notification of the STR AP MLD of the Ack+Trigger frame including control information indicating the transmission trigger on the second link before a PPDU #2-1 is transmitted.

Figure 11:
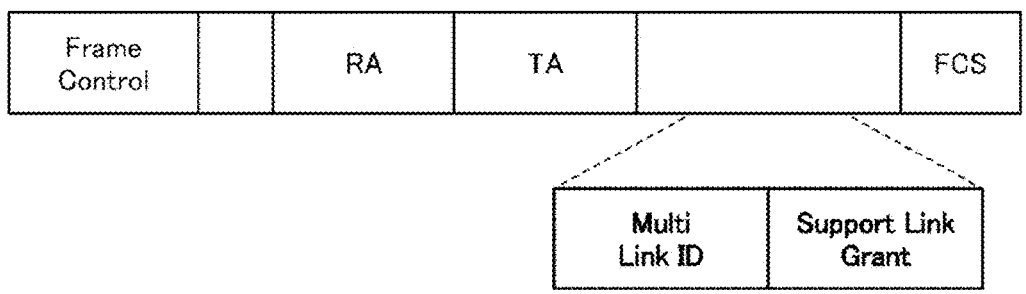
FIG. 11 is a diagram illustrating a configuration example of an Ack+Trigger frame.

FIG. 11 is a diagram illustrating a configuration example of the Ack+Trigger frame.

The Ack+Trigger frame includes Frame Control, RA, TA, Multi Link ID, Support Link Grant, and FCS. The components of the frame are not limited thereto, and other components may be included.

Frame Control includes information indicating that the frame is an Ack+Trigger frame.

RA and TA respectively include information indicating a transmission source terminal and a destination terminal. For example, a MAC address specific to the terminal may be indicated in RA and TA. Furthermore, in particular, in a case where the transmission source terminal and the destination terminal are MLDs, RA and TA may be MAC addresses defined for each individual communication set of the terminal or each link used by the terminal, and in addition, may be MAC addresses identified as MLDs.

Multi Link ID includes, for the destination terminal of the frame, information indicating a link used for transmission after the frame is received.

Support Link Grant includes information indicating that the destination terminal of the frame is permitted to perform transmission after reception of the frame.

FCS includes parity information for performing error correction on the information included in the frame by the reception terminal.

In FIG. 8, the STR AP MLD which is a terminal to which notification of the Ack+Trigger frame is provided as a desired destination may start transmission by using an arbitrary link among links indicated by Multi Link ID. Furthermore, as illustrated in FIG. 8, the Ack+Trigger frame can be transmitted together with an acknowledgement (Ack) frame.

Note that a similar frame, that is, the Ack+Trigger frame is exchanged immediately before transmission also in a case where the uplink (UL) is continuously performed or in a case where the downlink (DL) and the uplink (UL) are alternately performed. However, in a case where the uplink (UL) is performed subsequent to the downlink (DL), or in a case where the downlink (DL) is performed subsequent to the uplink (UL), it cannot be transmitted together with the acknowledgement (Ack) frame, and thus, for example, the following notifications can be performed.

Figure 12:
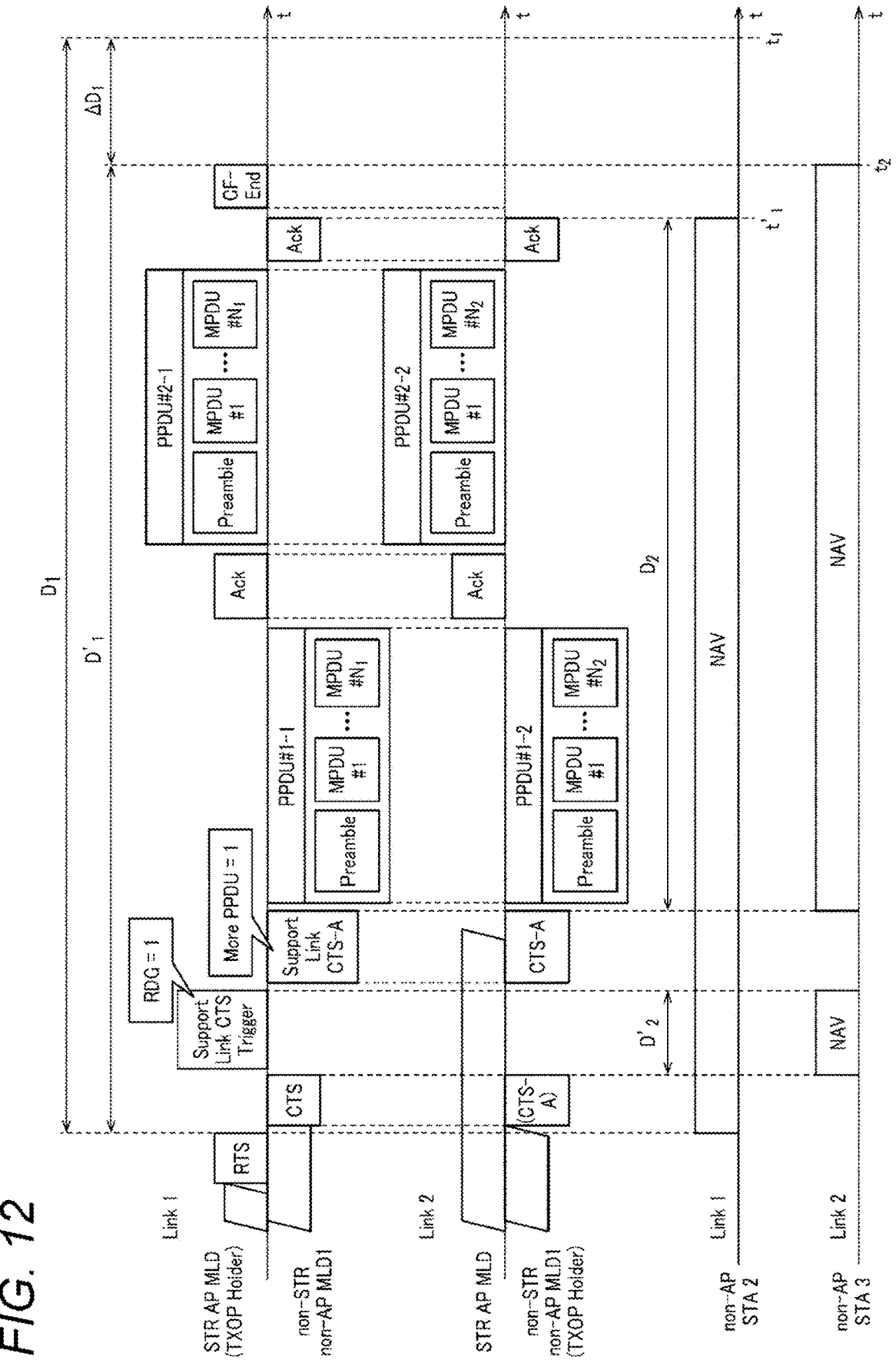
FIG. 12 is a diagram illustrating a frame transmitted by each terminal in time series in a case where uplink transmission is performed first and then downlink transmission is performed.

FIG. 12 is a diagram illustrating a frame transmitted by each terminal in time series in a case where the uplink transmission is performed first and then the downlink transmission is performed. In the time series of FIG. 12, as in the time series of FIG. 8, there are one STR AP MLD, one non-STR non-AP MLD 1, and a non-AP STA 2 and non-AP STA 3 as a plurality of STAs.

In FIG. 12, in a case where the uplink transmission is performed first, and then the downlink transmission is performed, the Ack+Trigger frame illustrated in FIG. 11 needs to be transmitted from the non-STR non-AP MLD before transmission of a PPDU #2-2. In this case, control information included in the frame can be included in a PPDU #1-2 to be provided in notification.

Note that in a case where the uplink transmission is performed subsequent to the downlink transmission, control information included in the Ack+Trigger frame can be included in the PPDU transmitted in the downlink transmission in a similar manner.

Figure 13:
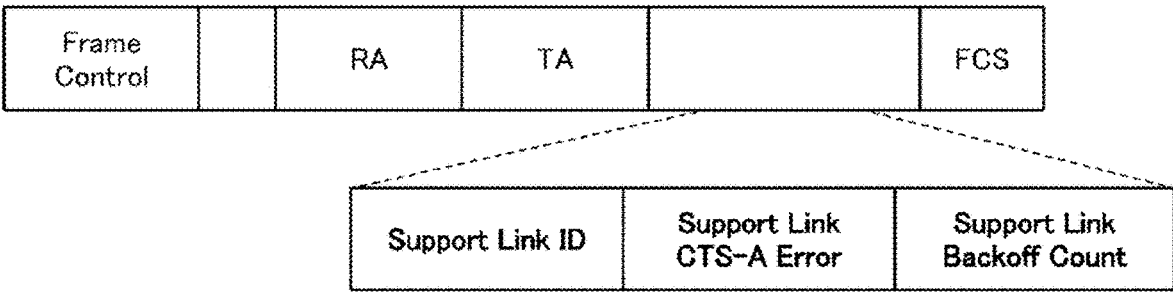
FIG. 13 is a diagram illustrating a configuration example of a frame included in a data unit in a case where DL transmission is performed.

FIG. 13 is a diagram illustrating a configuration example of a frame included in a data unit in a case where the DL transmission is performed.

The frame included in the data unit at the time of performing the DL Transmission includes Frame Control, RA, TA, Support Link ID, Support Link CTS-A Error, and Support Link Backoff Count. The components of the frame are not limited thereto, and other components may be included.

Frame Control includes information indicating that the frame is included in the data unit. RA and TA respectively include information indicating a transmission source terminal and a destination terminal.

For example, a MAC address specific to the terminal may be indicated in RA and TA. Furthermore, in particular, in a case where the transmission source terminal and the destination terminal are MLDs, RA and TA may be MAC addresses defined for each individual communication set of the terminal or each link used by the terminal, and in addition, may be MAC addresses identified as MLDs.

Support Link ID includes information indicating a link used by the CTS-A frame transmitted from the non-STR non-AP MLD 1 immediately before.

Support Link CTS-A Error includes information indicating a link on which the CTS-A frame fails to be correctly received among the links indicated by Support Link ID.

Support Link Backoff Count includes, for each link indicated in Support Link ID, information indicating a remaining transmission standby time due to back-off in the terminal that transmits the frame.

Note that as Support Link Backoff Count, a value of the back-off counter existing in the terminal that transmits the frame may be indicated. At this time, the back-off counter may indicate a value for each link.

Furthermore, Support Link ID, Support Link CTS-A Error, and Support Link Backoff Count are not included in the data unit, and may be included in, for example, Control Frame or Management Frame as disclosed in Document 2. However, in a case of being included in these frames, information indicated by Frame Control and information of other fields indicate that Support Link ID, Support Link CTS-A Error, and Support Link Backoff Count are included in the frame to be provided in notification.

FCS includes parity information for performing error correction on the information included in the frame by the reception terminal.

Figure 14:
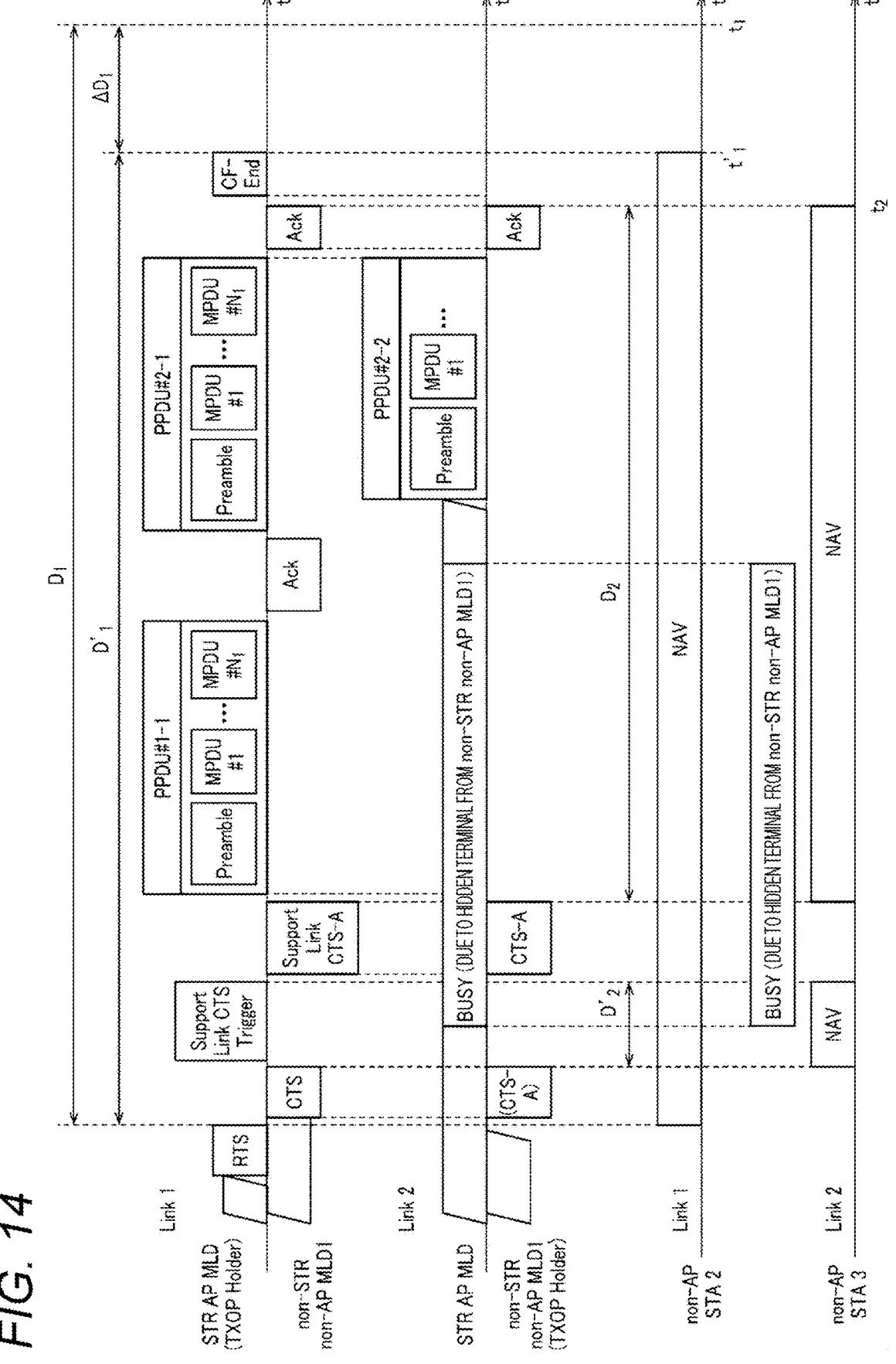
FIG. 14 is a diagram illustrating a frame transmitted by each terminal in time series in a case where a CTS-A frame is not correctly received by an STR AP MLD on a second link.

FIG. 14 is a diagram illustrating a frame transmitted by each terminal in time series in a case where the CTS-A frame is not correctly received by the STR AP MLD on the second link. In the time series of FIG. 14, as in the time series of FIG. 8, there are one STR AP MLD, one non-STR non-AP MLD 1, and a non-AP STA 2 and non-AP STA 3 as a plurality of STAs. In FIG. 14, the DL transmission is performed.

In FIG. 14, the CTS-A frame is transmitted from the non-STR non-AP MLD 1 by using the second link, but, for example, due to interference from the terminal around the STR AP MLD, the CTS-A frame cannot be correctly received and demodulated in a specific period and by the STR AP MLD ("BUSY" in FIG. 14).

In this case, since the transmission right has already been acquired by the STR AP MLD on the first link, relying on the Support Link CTS-A frame notification of which is provided from the non-STR non-AP MLD 1 on the first link, the STR AP MLD provides notification that the CTS-A frame fails to be correctly received on the second link with the frame transmitted on the first link. The information used at this time is information included in Support Link ID and Support Link CTS-A Error illustrated in FIG. 13.

In a case where the interference described above is interference caused by a signal of the wireless LAN, the STR AP MLD can estimate a period during which the STR AP MLD receives the interference and a time at which the STR AP MLD can start transmission on the second link after the back-off of the STR AP MLD expires after the end of reception of the interference. Information indicating the start time at this time or information for estimating the start time is included in Support Link Backoff count illustrated in FIG. 13.

As illustrated in FIG. 14, while the non-STR non-AP MLD 1 receives a PPDU #1-1 on the first link, the non-STR non-AP MLD 1 cannot transmit any signal due to the restriction of NSTR. Furthermore, it is indicated that the STR AP MLD is ready to perform transmission and starts transmission after the reception of the PPDU #1-1 is completed.

At this time, it is indicated that regardless that the non-STR non-AP MLD 1 has acquired the transmission right, on the second link, the STR AP MLD 1 starts transmission without a control signal (trigger) for triggering transmission from the non-STR non-AP MLD 1. This is the reason why the PPDU #2-1 is received by the non-STR non-AP MLD 1 on the first link as illustrated in FIG. 14, and thus the non-STR non-AP MLD 1 cannot transmit any signal during the reception period due to the restriction of NSTR.

However, for example, in a case where Support Link Backoff count (FIG. 13) indicates that the time at which the STR AP MLD can start transmission on the second link is a time after the completion of reception of the PPDU #1-1 (or information that can be estimated is included), the non-STR non-AP MLD 1 can transmit, for example, a frame including the subsequent information. That is, first, information indicating that the transmission to the STR AP MLD is triggered using the second link on the second link at the same time as the acknowledgement (Ack) on the first link can be included, and second, information indicating that the transmission right acquired on the second link is released can be included. However, the frame including information to be indicated in the subsequent stage can be performed using a CF-End frame disclosed in Document 2.

Figure 15:
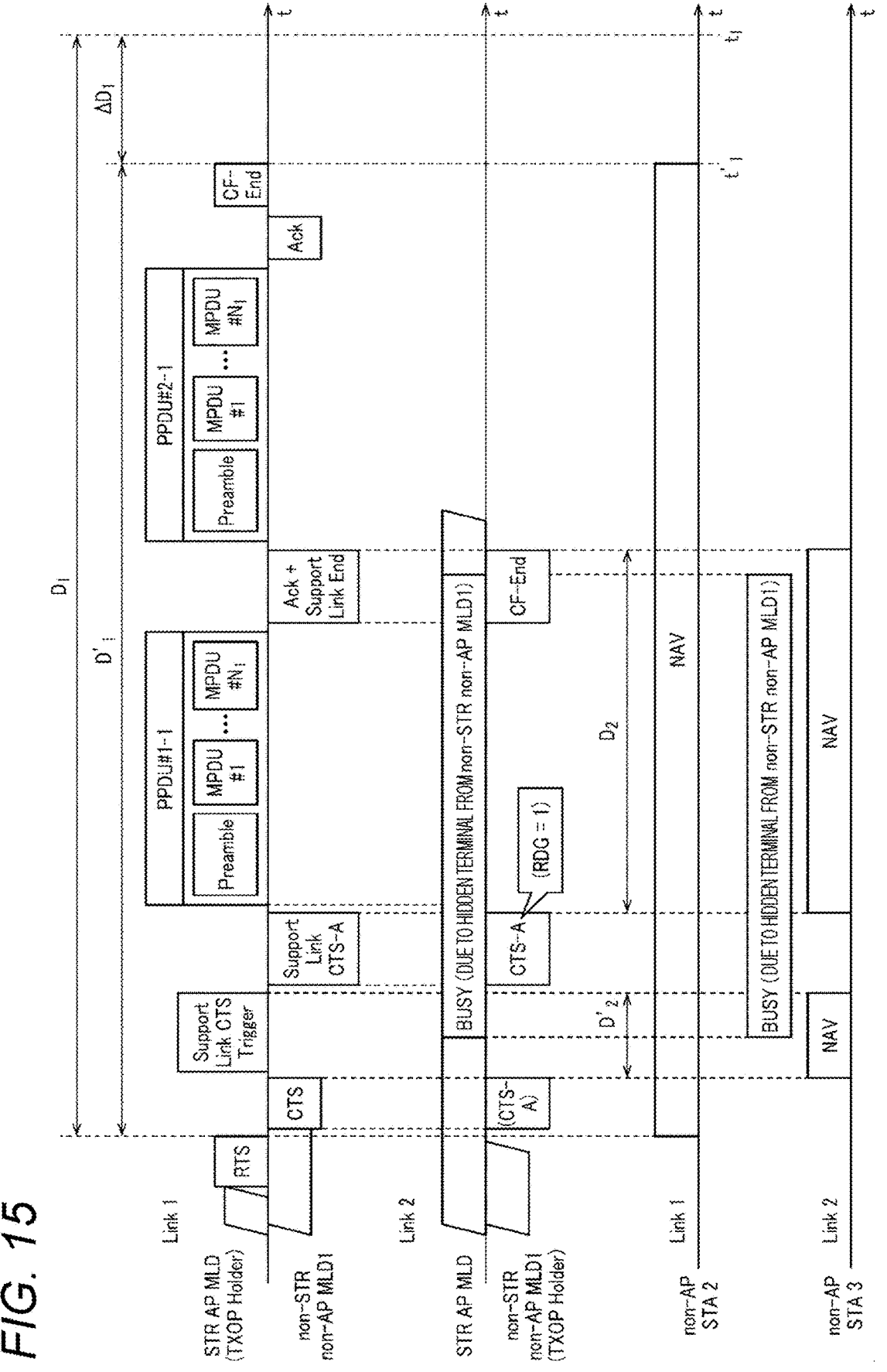
FIG. 15 is a diagram illustrating a frame transmitted by each terminal in time series in a case where a transmission right acquired through a second link is released.

FIG. 15 is a diagram illustrating a frame transmitted by each terminal in time series in a case where the transmission right acquired on the second link is released. In the time series of FIG. 15, as in the time series of FIG. 8, there are one STR AP MLD, one non-STR non-AP MLD 1, and a non-AP STA 2 and non-AP STA 3 as a plurality of STAs.

FIG. 15 illustrates that the CF-End frame is used as a frame including information indicated in the subsequent stage, that is, information indicating that the transmission right acquired on the second link is released.

At this time, at the same time as the time at which the CF-End frame is transmitted on the second link, the non-STR non-AP MLD 1 notifies the STR AP MLD of information indicating that the transmission right acquired by the non-STR non-AP MLD on the second link is released by using the first link.

Figure 16:
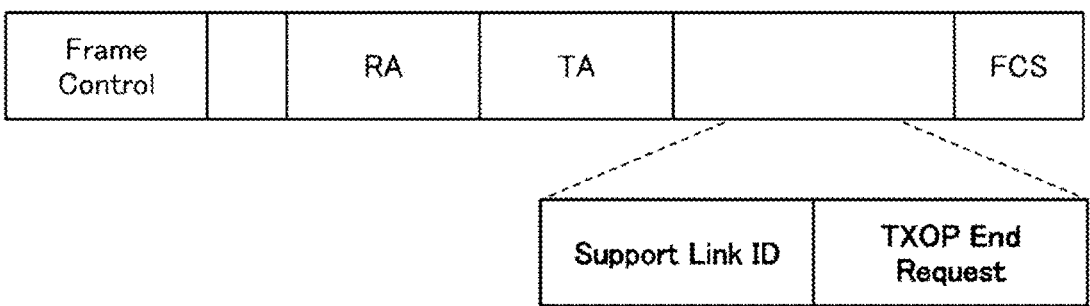
FIG. 16 is a diagram illustrating a configuration example of a Support Link End frame.

FIG. 16 is a diagram illustrating a configuration example of a Support Link End frame notification of which is provided in a case where the transmission right acquired on the link is released.

The Support Link End frame includes Frame Control, RA, TA, Support Link ID, TXOP End Request, and FCS. The components of the frame are not limited thereto, and other components may be included.

Frame Control includes information indicating that Support Link ID and TXOP End Request are included in the frame. RA and TA respectively include information indicating a transmission source terminal and a destination terminal.

Support Link ID includes information indicating a link on which the transmission right acquired by the terminal transmitting the frame is released on a link other than the link on which the frame is transmitted.

TXOP End Request includes information indicating that the transmission right acquired by the terminal transmitting the frame is released on the link indicated by Support Link ID.

FCS includes parity information for performing error correction on the information included in the frame by the reception terminal.

Figure 17:
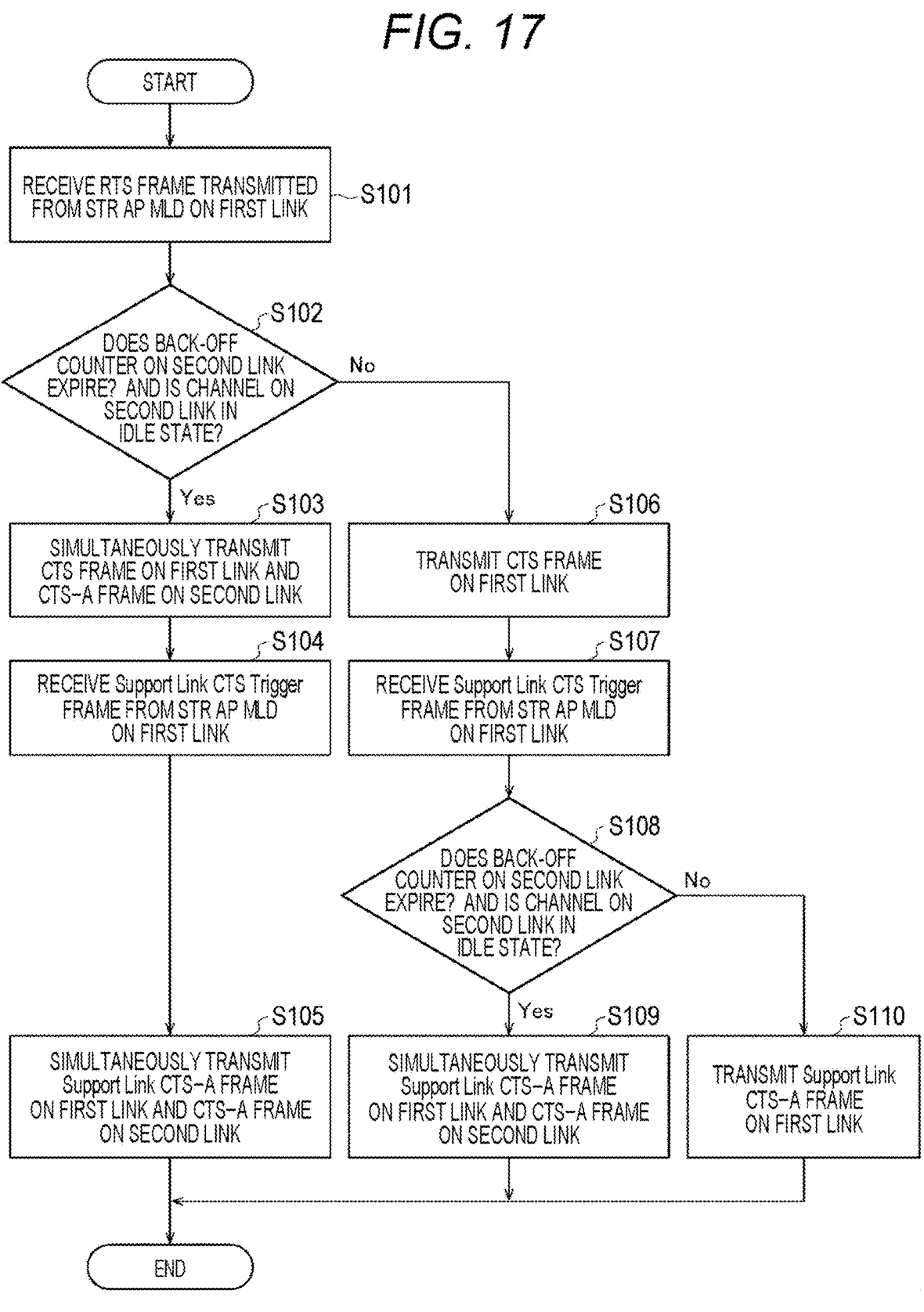
FIG. 17 is a flowchart illustrating a flow of processing performed by a non-STR non-AP MLD.

Here, the above-described operations in the non-STR non-AP MLD and STR AP MLD will be described with reference to a flowchart systematically illustrated. In FIG. 17 and FIG. 18, similarly to the configuration example of FIG. 3, it is assumed that there are one STR AP MLD, one non-STR non-AP MLD, and one or a plurality of STAs. Furthermore, also in FIG. 17 and FIG. 18, the first link (Link 1) is a basic link, and the second link (Link 2) is a support link.

(Processing Example of Non-STR Non-AP MLD)

First, a flow of processing performed by the non-STR non-AP MLD will be described with reference to the flowchart of FIG. 17.

The processing performed by the non-STR non-AP MLD starts from notification of the RTS frame from the STR AP MLD on the first link, and the non-STR non-AP MLD receives the RTS frame transmitted from the STR AP MLD on the first link (S101).

The non-STR non-AP MLD that has received the RTS frame determines whether or not the back-off counter (or back-off) on the second link expires and a channel on the second link is in an idle state (unused state) (S102).

In a case where it is determined that the channel on the second link is in the idle state ("Yes" in S102), the non-STR non-AP MLD generates a CTS frame and a CTS-A frame, and simultaneously transmits, to the STR AP MLD, the CTS frame on the first link and the CTS-A frame on the second link (S103).

On the other hand, in a case where it is determined that the channel on the second link is not in the idle state ("No" in S102), the non-STR non-AP MLD generates the CTS frame, and transmits, to the STR AP MLD, the CTS frame on the first link (S106). In this case, the transmission of the CTS-A frame on the second link is not performed.

Thereafter, since notification of the Support Link CTS Trigger frame is provided from the STR AP MLD on the first link, the non-STR non-AP MLD receives the Support Link CTS Trigger frame transmitted from the STR AP MLD (S104, S107).

At this time, in a case where the CTS-A frame is transmitted in advance on the second link (S103, S104), the non-STR non-AP MLD acquires a transmission right on the second link. For the purpose of extending this transmission right, the non-STR non-AP MLD transmits the CTS-A frame to the STR AP MLD on the second link (S105).

Furthermore, the non-STR non-AP MLD generates a Support Link CTS-A frame, and transmits the Support Link CTS-A frame to the STR AP MLD on the first link simultaneously with the CTS-A frame (S105). Therefore, it is possible to notify the STR AP MLD that the non-STR non-AP MLD has acquired the transmission right on the second link and provide notification of a period of the acquired transmission right.

On the other hand, in a case where the CTS-A frame is not transmitted in advance on the second link (S106, S107), the non-STR non-AP MLD does not acquire the transmission right on the second link. Therefore, the non-STR non-AP MLD determines again whether or not the back-off counter (or back-off) on the second link expires and a channel on the second link is in an idle state (S108).

In a case where it is determined that the channel on the second link is in the idle state ("Yes" in S108), the non-STR non-AP MLD generates a Support Link CTS-A frame and a CTS-A frame, and simultaneously transmits, to the STR AP MLD, the Support Link CTS-A frame on the first link and the CTS-A frame on the second link (S109).

On the other hand, in a case where it is determined that the channel on the second link is not in the idle state ("No" in S108), the non-STR non-AP MLD generates a Support Link CTS-A frame, and transmits, to the STR AP MLD, the Support Link CTS-A frame on the first link (S110). In this case, the transmission of the CTS-A frame on the second link is not performed.

When the processing in any one of steps S105, S109, or S110 ends, a series of processing performed by the non-STR non-AP MLD ends.

(Processing Example of STR AP MLD)

Next, a flow of processing performed by the STR AP MLD will be described with reference to the flowchart of FIG. 18.

The processing performed by the STR AP MLD starts from notification of a Support Link CTS-A frame on the first link and notification of a CTS-A frame on the second link, the notifications being performed by the non-STR non-AP MLD. That is, in the processing of step S109 in FIG. 17, it is assumed that the non-STR non-AP MLD simultaneously transmits the Support Link CTS-A frame on the first link and the CTS-A frame on the second link.

The STR AP MLD determines whether or not the CTS-A frame transmitted from the non-STR non-AP MLD on the second link has been correctly received (S121).

In a case where it is determined that the CTS-A frame transmitted from the non-STR non-AP MLD on the second link has been correctly received ("Yes" in S121), the STR AP MLD analyzes and determines whether or not it is described in the Support Link CTS-A frame and the CTS-A frame that a PPDU is transmitted subsequently (S122).

In a case where it is determined that the PPDU is subsequently transmitted ("Yes" in S122), the STR AP MLD performs operation of receiving the PPDU transmitted from the non-STR non-AP MLD on the first link and the second link (S123).

Furthermore, in a case where it is determined that the PPDU is not transmitted subsequently ("No" in S122), the STR AP MLD performs the operation of transmitting the PPDU to the non-STR non-AP MLD on the first link and the second link (S124).

Here, regarding the fact that the "PPDU is transmitted subsequent to the Support Link CTS-A frame and the CTS-A frame" ("Yes" in S122), in a case where at least one of the following (c) or (d) is satisfied for transmission from the non-STR non-AP MLD to the STR AP MLD, the STR AP MLD can perform such interpretation.

(c) A case where an RDG/More PPDU subfield in the Support Link CTS-A frame notification of which is provided on the first link includes information indicating that the PPDU is subsequently transmitted after the Support Link CTS-A frame (d) A case where the RDG/More PPDU subfield in the CTS-A frame notification of which is provided on the second link does not include information indicating permission to transmit the PPDU after receiving the CTS-A frame for the STR AP MLD as a destination Furthermore, regarding the fact that the "PPDU is not transmitted subsequent to the Support Link CTS-A frame and the CTS-A frame" ("No" in S122), in a case where at least one of the following (e) or (f) is satisfied for transmission from the non-STR non-AP MLD to the STR AP MLD, the STR AP MLD can perform such interpretation.

(e) A case where an RDG/More PPDU subfield in the Support Link CTS-A frame notification of which is provided on the first link does not include information indicating that the PPDU is subsequently transmitted after the Support Link CTS-A frame (f) A case where the RDG/More PPDU subfield in the CTS-A frame notification of which is provided on the second link includes information indicating permission to transmit the PPDU after receiving the CTS-A frame for the STR AP MLD as a destination That is, in order to provide notification of the information indicating that the PPDU is transmitted subsequent to the Support Link CTS-A frame and the CTS-A frame, the non-STR non-AP MLD generates and provides notification of the information so as to satisfy at least one of the above-described (c) or (d). According to this, in order to provide notification of the information indicating that the PPDU is not transmitted subsequent to the Support Link CTS-A frame and the CTS-A frame, the non-STR non-AP MLD generates and provides notification of the information so as to satisfy at least one of the above-described (e) or (f).

On the other hand, in a case where it is determined that the CTS-A frame transmitted from the non-STR non-AP MLD on the second link cannot be correctly received ("No" in S121), the STR AP MLD analyzes and determines whether or not it is described in the Support Link CTS-A frame that the PPDU is transmitted subsequently (S125).

In a case where it is determined that the PPDU is subsequently transmitted ("Yes" in S125), the STR AP MLD performs operation of receiving the PPDU transmitted from the non-STR non-AP MLD at least on the first link (S126).

Furthermore, in a case where it is determined that the PPDU is not transmitted subsequently ("No" in S125), the STR AP MLD performs the operation of transmitting the PPDU to the non-STR no-AP MLD on the first link and the second link (S127). Furthermore, the STR AP MLD can transmit the PPDU including information indicating that the CTS-A frame fails to be correctly received to the non-STR non-AP MLD by using the first link (S127).

Note that in a case where the CTS-A frame notification of which is provided from the non-STR non-AP MLD on the second link cannot be correctly received ("No" in S121), for example, it is considered that the CTS-A frame cannot be correctly received due to an interference signal from another wireless communication terminal in the vicinity of the STR AP MLD that receives the CTS-A frame. The period of the interference signal may extend to the reception period of the PPDU notification of which is provided from the non-STR non-AP MLD on the second link, and the PPDU notification of which is provided from the non-STR non-AP MLD cannot be correctly received and demodulated on the second link.

In this case, MPDUs notification of which is provided from the non-STR non-AP MLD on the first link and the second link can be controlled by the common control unit 122 (FIG. 4) such that the sequence numbers of the MPDUs transmitted on the first link and the second link are, for example, allocated as below. That is, a set of arbitrary sequence numbers assigned to the MPDU transmitted on the first link can be controlled to be smaller than an arbitrary sequence number transmitted on another link.

When the processing in any one of steps S123, S124, S126 or S127 ends, a series of processing performed by the STR AP MLD ends.

As described above, in the communication device (for example, the communication device 10A that is the STR AP MLD) to which the present technology is applied, the control unit (for example, the control unit 100 or the communication control unit 111) performs control for: transmitting, to another communication device (for example, the communication device 10B that is the non-STR non-AP MLD), a first frame (for example, the RTS frame) including a request for acquiring a transmission right on the first link by using the first link (for example, the basic link); generating a third frame (for example, the Support Link CTS Trigger frame) including information for triggering another communication device to acquire a transmission right on the second link (for example, the support link) different from the first link in a case where a second frame (for example, the CTS frame) including permission to acquire the transmission right on the first link is received, the second frame being transmitted from another communication device by using the first link; and transmitting the third frame to another communication device by using the first link.

Furthermore, in the communication device (for example, the communication device 10B that is the non-STR non-AP MLD) to which the present technology is applied, the control unit (for example, the control unit 100 or the communication control unit 111) performs control for: transmitting, to another communication device, a second frame (for example, the CTS frame) including permission to acquire the transmission right on the first link by using the first link in a case where a first frame (for example, the RTS frame) including a request for acquiring the transmission right on the first link is received, the first frame being transmitted from another communication device (for example, the communication device 10A that is the STR AP MLD) by using the first link (for example, the basic link); generating a fourth frame (for example, the Support Link CTS-A frame) including information indicating the transmission right acquired on the second link in a case where a third frame (for example, Support Link CTS Trigger frame) including information for triggering acquisition of the transmission right on the second link (for example, the support link) different from the first link is received, the third frame being transmitted from another communication device by using the first link; and transmitting the fourth frame to another communication device by using the first link.

Moreover, in the communication device (for example, the communication device 10B that is the non-STR non-AP MLD) to which the present technology is applied, in a case where the third frame (for example, the Support Link CTS Trigger frame) from another communication device is received by using the first link (for example, the basic link), when the second link (for example, the support link) is not used, the control unit (for example, the control unit 100 or the communication control unit 111) performs control for generating a fifth frame (for example, the CTS-A frame) including information indicating the transmission right acquired on the second link, and transmitting the fourth frame (for example, the Support Link CTS-A frame) by using the first link and transmitting the fifth frame to another communication device by using the second link.

Therefore, an opportunity to acquire the transmission right on a plurality of the links can be increased. For example, in the communication device (for example, the communication device 10B that is the non-STR non-AP MLD), the transmission right on the second link (for example, the support link) can be acquired.

2. Modification Example

Another Configuration Example

As described above, the communication device 10A can be configured as the STR AP MLD, and the communication device 10B can be configured as the non-STR non-AP MLD. However, the communication device 10A or the communication device 10B may be configured as a part of devices (components) configuring the STR AP MLD or the non-STR non-AP MLD (for example, a wireless communication module, a wireless chip, or the like).

Furthermore, the communication device 10B configured as the non-STR non-AP MLD and the communication devices 10C and 10D configured as the non-AP STAs can be configured as, for example, an electronic device having a wireless communication function, such as a smartphone, a tablet terminal, a game machine, a portable telephone, a personal computer, a digital camera, a television receiver, a wearable terminal, or a speaker device. Moreover, the communication device 10B to 10D may be electronic devices that support only data transmission, such as controllers that transmit command data according to a user's operation, or devices that support only data reception, such as display devices that receive and display video data.

Note that the series of processing of the communication device 10 described above can be executed by hardware or software. In a case where the series of processing is executed by the software, a program which configures the software is installed on the communication device 10.

Furthermore, embodiments of the present technology are not limited to the embodiment described above but can be modified in a wide variety of ways within a scope of the present technology. For example, each embodiment has been described above with reference to the sequence diagrams, the frame configuration diagrams, and the flowcharts, but these embodiments are not necessarily limited to the illustrated configurations, and may be selectively used according to a situation. Moreover, the effect described in this specification is illustrative only and is not limitative; there may also be another effect. Note that the "CTS-A frame" described above may be replaced with a "CTS-to-self frame" including similar information.

Note that the present technology can have the following configurations.

(1)

A communication device including a control unit configured to perform control for:

exchanging a frame with another communication device wirelessly by using a plurality of links;

transmitting, to the another communication device, a first frame including a request for acquisition of a transmission right on a first link by using the first link;

generating a third frame including information for triggering the another communication device to acquire a transmission right on a second link different from the first link in a case where a second frame including permission to acquire the transmission right on the first link is received, the second frame being transmitted from the another communication device by using the first link; and transmitting the third frame to the another communication device by using the first link.

27

(2)

The communication device according to (1), in which the third frame includes information indicating a transmission right or a transmission period, which is acquired with a fourth frame for requesting the another communication device to perform transmission.

(3)

The communication device according to (2), in which the third frame includes information indicating the second link for requesting transmission of the fourth frame.

(4)

The communication device according to (2) or (3), in which the third frame includes information indicating permission to transmit a data unit on the first link and second link to the another communication device in transmission temporally later than a fifth frame transmitted from the another communication device by using the first link temporally later than the third frame.

(5)

The communication device according to (4), in which in a case where the fifth frame including information indicating a transmission right acquired on the second link is received, the fifth frame being transmitted from the another communication device by using the first link, the control unit receives or transmits the data unit from or to the another communication device by using at least the first link on the basis of information indicating whether or not to transmit the data unit subsequent to the fifth frame included in the fifth frame.

(6)

The communication device according to (5), in which in a case where the fourth frame including information indicating a transmission right acquired on the second link is normally received, the fourth frame being transmitted from the another communication device by using the second link, the control unit receives or transmits the data unit from or to the another communication device by using the first link and the second link on the basis of information indicating permission to transmit the data unit after the fourth frame is received included in the fourth frame.

(7)

The communication device according to (6), in which in a case where the fourth frame is not normally received, the control unit receives or transmits the data unit from or to the another communication device by using at least the first link.

(8)

The communication device according to (7), in which by using the first link, the control unit transmits, to the another communication device, the data unit including information indicating that the fourth frame fails to be normally received.

(9)

The communication device according to any one of (1) to (8), in which the communication device is configured as an access point that supports transmission using a plurality of the links at the same time and is capable of performing transmission and reception on each of the links, and the another communication device includes a user terminal capable of performing transmission or reception between a plurality of the links.

28

(10)

A communication device including a control unit configured to perform control for:

exchanging a frame with another communication device wirelessly by using a plurality of links;

transmitting, to the another communication device, a second frame including permission to acquire a transmission right on a first link by using the first link in a case where a first frame including a request for acquisition of the transmission right on the first link is received, the first frame being transmitted from the another communication device by using the first link;

generating a fifth frame including information indicating a transmission right acquired on a second link in a case where a third frame including information for triggering acquisition of the transmission right on the second link different from the first link is received, the third frame being transmitted from the another communication device by using the first link; and transmitting the fifth frame to the another communication device by using the first link.

(11)

The communication device according to (10), in which in a case where the third frame from the another communication device is received by using the first link, when the second link is not used, the control unit generates a fourth frame including information indicating a transmission right acquired on the second link, and transmits the fifth frame by using the first link and transmits the fourth frame to the another communication device by using the second link.

(12)

The communication device according to (11), in which the fifth frame includes information indicating a transmission right or a transmission period, which is acquired with the fourth frame.

(13)

The communication device according to (11) or (12), in which the fifth frame includes information indicating the second link on which the fourth frame is transmitted.

(14)

The communication device according to any one of (11) to (13), in which the fifth frame includes information indicating whether or not a data unit is transmitted by using the second link subsequent to the fifth frame.

(15)

The communication device according to any one of (11) to (14), in which the fourth frame includes information indicating that a transmission right on the second link is acquired in a period corresponding to information indicating permission to transmit a data unit on the first link and the second link, the information being included in the third frame.

(16)

The communication device according to any one of (11) to (15), in which in a case where the first frame from the another communication device is received by using the first link and the second link is in use, when the third frame from the another communication device is received by using the first link and the second link is in use, the control unit transmits the fifth frame to the another communication device by using the first link.

(17)

The communication device according to (16), in which in a case where the first frame from the another communication device is received by using the first link and the second link is in use, when the third frame from the another communication device is received by using the first link and the second link is not used, the control unit transmits the fifth frame by using the first link and transmits the fourth frame to the another communication device by using the second link.

(18)

The communication device according to any one of (10) to (17), in which when data units are transmitted to the another communication device by using the first link and the second link after the fifth frame is transmitted to the another communication device by using the first link, sequence numbers assigned to a plurality of sub-data units configuring each of the data units transmitted on links are consecutive.

(19)

The communication device according to (18), in which a set of arbitrary sequence numbers assigned to each of the sub-data units, which is transmitted on the first link, is smaller than any sequence number assigned to the sub-data unit transmitted on the second link.

(20)

The communication device according to any one of (10) to (19), in which the communication device is configured as a user terminal capable of performing transmission or reception between a plurality of the links, and the another communication device includes an access point that supports transmission using a plurality of the links at the same time and is capable of performing transmission and reception on each link.

REFERENCE SIGNS LIST

10, 10A, 10B Communication device
100 Control unit
101 Communication unit
102 Storage unit
111 Communication control unit
112 Communication storage unit
113 Common data processing unit
114-1, 114-2 Individual data processing unit
115-1, 115-2 Signal processing unit
116-1, 116-2 Wireless interface unit
117-1, 117-2 Amplification unit
118-1, 118-2 Antenna

The invention claimed is:

1. A communication control device comprising:

control circuitry configured to perform control of a wireless communication device that is configured to wirelessly communicate by using a plurality of links simultaneously, the control comprising controlling the wireless communication device to:

perform a process of communicating wirelessly a plurality of frames with another wireless communication device that is not configured to use the plurality of links simultaneously, wherein the process comprises:

transmitting, to the another wireless communication device via a first link of the plurality of links, a first frame of the plurality of frames, the first frame including a request for acquisition by the wireless communication device of a right to transmit on the first link;

in response to the first frame, receiving via the first link a second frame of the plurality of frames from the another wireless communication device, the second frame including a grant of the right to transmit to the wireless communication device on the first link;

transmitting a third frame of the plurality of frames to the another wireless communication device via the first link, wherein the third frame includes a trigger signal for triggering the another wireless communication device to simultaneously transmit to the wireless communication device:

a fourth frame on the first link, the fourth frame including information indicating a grant of a right to the wireless communication device to transmit a first physical layer protocol data unit (PPDU) on the first link, and a fifth frame on a second link of the plurality of links that is different from the first link, the fifth frame including information indicating a grant of a right to the wireless communication device to transmit a second PPDU on the second link; and based on receiving the fourth frame and the fifth frame, simultaneously transmitting the first and second PPDUs to the another wireless communication device on the first and second links, respectively.

2. A communication control device comprising:

control circuitry configured to perform control of a wireless communication device that is configured to wirelessly communicate by using a plurality of links non-simultaneously, the control comprising controlling the wireless communication device to:

perform a process of communicating wirelessly a plurality of frames with another wireless communication device that is configured to use the plurality of links simultaneously, wherein the process comprises:

receiving, from the another wireless communication device via a first link of the plurality of links, a first frame of the plurality of frames, the first frame including information indicating a request for acquisition by the another wireless communication device of a right to transmit on the first link;

in response to the first frame, transmitting via the first link a second frame of the plurality of frames to the another wireless communication device, the second frame including information indicating a grant of the right to transmit to the another wireless communication device on the first link;

receiving a third frame of the plurality of frames from the another wireless communication device via the first link, wherein the third frame includes a trigger signal for triggering the wireless communication device to simultaneously transmit to the another wireless communication device:

a fourth frame on the first link, the fourth frame including information indicating a grant of a right to the another wireless communication device to transmit a first physical layer protocol data unit (PPDU) on the first link, and a fifth frame on a second link of the plurality of links that is different from the first link, the fifth frame including information indicating a grant of a right to the another wireless communication device to transmit a second PPDU on the second link;

simultaneously transmitting the fourth and fifth frames to the another wireless communication device via the first and second links, respectively; and based on the another wireless communication device receiving the fourth frame and the fifth frame, simultaneously receiving the first and second PPDUs from the another wireless communication device on the first and second links, respectively.

3. A control method performed by a communication control device that controls a wireless communication device that is configured to wirelessly communicate by using a plurality of links simultaneously, the control method comprising:

controlling the wireless communication device to perform a process of communicating wirelessly a plurality of frames with another wireless communication device that is not configured to use the plurality of links simultaneously, wherein the process comprises:

transmitting, to the another wireless communication device via a first link of the plurality of links, a first frame of the plurality of frames, the first frame including a request for acquisition by the wireless communication device of a right to transmit on the first link;

in response to the first frame, receiving via the first link a second frame of the plurality of frames from the another wireless communication device, the second frame including a grant of the right to transmit to the wireless communication device on the first link;

transmitting a third frame of the plurality of frames to the another wireless communication device via the first link, wherein the third frame includes a trigger signal for triggering the another wireless communication device to simultaneously transmit to the wireless communication device:

a fourth frame on the first link, the fourth frame including information indicating a grant of a right to the wireless communication device to transmit a first physical layer protocol data unit (PPDU) on the first link, and a fifth frame on a second link of the plurality of links that is different from the first link, the fifth frame including information indicating a grant of a right to the wireless communication device to transmit a second PPDU on the second link; and based on receiving the fourth frame and the fifth frame, simultaneously transmitting the first and second PPDUs to the another wireless communication device on the first and second links, respectively.

4. A control method performed by a communication control device configured to control a wireless communication device that is configured to wirelessly communicate by using a plurality of links non-simultaneously, the control method comprising controlling the wireless communication device to:

perform a process of communicating wirelessly a plurality of frames with another wireless communication device that is configured to use the plurality of links simultaneously, wherein the process comprises:

receiving, from the another wireless communication device via a first link of the plurality of links, a first frame of the plurality of frames, the first frame including information indicating a request for acquisition by the another wireless communication device of a right to transmit on the first link;

in response to the first frame, transmitting via the first link a second frame of the plurality of frames to the another wireless communication device, the second frame including information indicating a grant of the right to transmit to the another wireless communication device on the first link;

receiving a third frame of the plurality of frames from the another wireless communication device via the first link, wherein the third frame includes a trigger signal for triggering the wireless communication device to simultaneously transmit to the another wireless communication device:

a fourth frame on the first link, the fourth frame including information indicating a grant of a right to the another wireless communication device to transmit a first physical layer protocol data unit (PPDU) on the first link, and a fifth frame on a second link of the plurality of links that is different from the first link, the fifth frame including information indicating a grant of a right to the another wireless communication device to transmit a second PPDU on the second link;

simultaneously transmitting the fourth and fifth frames to the another wireless communication device via the first and second links, respectively; and based on the another wireless communication device receiving the fourth frame and the fifth frame, simultaneously receiving the first and second PPDUs from the another wireless communication device on the first and second links, respectively.

\* \* \* \* \*